US012759154B2

(12) United States Patent
Saunders et al.

(10) Patent No.: US 12,759,154 B2
(45) Date of Patent: Oct. 13, 2026

(54) SYSTEMS AND METHODS FOR SAFE OPERATION OF ROBOTS

(71) Applicant: Boston Dynamics, Inc., Waltham, MA (US)

(72) Inventors: John Aaron Saunders, Arlington, MA (US); Michael Murphy, Carlisle, MA (US)

(73) Assignee: Boston Dynamics, Inc., Waltham, MA (US)

( * ) Notice: Subject to any disclaimer, the term of this patent is extended or adjusted under 35 U.S.C. 154(b) by 132 days.

(21) Appl. No.: 18/471,951

(22) Filed: Sep. 21, 2023

(65) Prior Publication Data

US 2024/0100702 A1 Mar. 28, 2024

Related U.S. Application Data

(60) Provisional application No. 63/408,893, filed on Sep. 22, 2022.

(51) Int. Cl.
*B25J 9/16* (2006.01)

(52) U.S. Cl.
CPC ............. *B25J 9/1676* (2013.01); *B25J 9/162* (2013.01)

(58) Field of Classification Search
CPC ...... B25J 9/1676; B25J 9/1666; B25J 9/1697; B25J 19/06
See application file for complete search history.

(56) References Cited

U.S. PATENT DOCUMENTS 10,099,372 B2 10/2018 Vu et al.
10,882,185 B2 1/2021 Vu et al.
10,887,578 B2 1/2021 Denenberg et al.
10,887,579 B2 1/2021 Denenberg et al.
10,899,007 B2 1/2021 Vu et al.
11,040,450 B2 6/2021 Vu et al.
11,097,422 B2 8/2021 Denenberg et al.
11,156,981 B2 10/2021 Dedkov et al.
11,254,004 B2 2/2022 Denenberg et al.
11,256,241 B1 2/2022 Sobalvarro et al.
11,279,039 B2 3/2022 Vu et al.
(Continued)

OTHER PUBLICATIONS

International Search Report and Written Opinion issued for International Patent Application No. PCT/US2023/074667, mailed on Jan. 24, 2024, 15 pages.
(Continued)

*Primary Examiner* — Khoi H Tran
(74) *Attorney, Agent, or Firm* — Pierce Atwood LLP

(57) ABSTRACT

Methods and apparatus for implementing a safety system for a mobile robot are described. The method comprises receiving first sensor data from one or more sensors, the first sensor data being captured at a first time, identifying, based on the first sensor data, a first unobserved portion of a safety field in an environment of a mobile robot, assigning, to each of a plurality of contiguous regions within the first unobserved portion of the safety field, an occupancy state, updating, at a second time after the first time, the occupancy state of one or more of the plurality of contiguous regions, and determining one or more operating parameters for the mobile robot, the one or more operating parameters based, at least in part, on the occupancy state of at least some regions of the plurality of contiguous regions at the second time.

20 Claims, 23 Drawing Sheets

(56) References Cited

U.S. PATENT DOCUMENTS

| | | | |
|---|---|---|---|
| 11,376,741 | B2 | 7/2022 | Vu et al. |
| 11,396,099 | B2 | 7/2022 | Wartenberg et al. |
| 11,518,051 | B2 | 12/2022 | Vu et al. |
| 11,541,543 | B2 | 1/2023 | Vu et al. |
| 11,543,796 | B2 | 1/2023 | Dedkov et al. |
| 11,543,798 | B2 | 1/2023 | Denenberg et al. |
| 11,613,017 | B2 | 3/2023 | Denenberg et al. |
| 11,623,356 | B2 | 4/2023 | Vu et al. |
| 11,635,749 | B2 | 4/2023 | Sobalvarro et al. |
| 11,636,648 | B2 | 4/2023 | Mello et al. |
| 11,766,780 | B2 | 9/2023 | Denenberg et al. |
| 11,820,025 | B2 | 11/2023 | Vu et al. |
| 11,830,131 | B2 | 11/2023 | Mello et al. |
| 11,919,173 | B2 | 3/2024 | Denenberg et al. |
| 2015/0217455 | A1* | 8/2015 | Kikkeri ................. G06T 7/0004 700/259 |
| 2020/0077075 | A1 | 3/2020 | Denenberg et al. |
| 2020/0272123 | A1 | 8/2020 | Denenberg et al. |
| 2020/0331146 | A1 | 10/2020 | Vu et al. |
| 2020/0331155 | A1* | 10/2020 | Vu ........................... B25J 19/06 |
| 2020/0334899 | A1 | 10/2020 | Mello et al. |
| 2021/0053224 | A1 | 2/2021 | Schroeder et al. |
| 2021/0053225 | A1 | 2/2021 | Kriveshko et al. |
| 2021/0053226 | A1 | 2/2021 | Mello et al. |
| 2021/0099689 | A1 | 4/2021 | Denenberg et al. |
| 2021/0205995 | A1* | 7/2021 | Vu ......................... B25J 9/1666 |
| 2021/0260770 | A1* | 8/2021 | Vu .......................... G01S 17/88 |
| 2021/0312706 | A1 | 10/2021 | Mello et al. |
| 2021/0339396 | A1 | 11/2021 | Denenberg et al. |
| 2021/0379762 | A1* | 12/2021 | Denenberg ............. B25J 9/1651 |
| 2021/0379763 | A1 | 12/2021 | Denenberg et al. |
| 2021/0389745 | A1 | 12/2021 | Dedkov et al. |
| 2022/0004162 | A1 | 1/2022 | Kriveshko et al. |
| 2022/0088787 | A1* | 3/2022 | Vu ......................... B25J 9/1676 |
| 2022/0121181 | A1 | 4/2022 | Sobalvarro et al. |
| 2022/0126449 | A1 | 4/2022 | Denenberg et al. |
| 2022/0126451 | A1* | 4/2022 | Hopkinson ............ B25J 9/1676 |
| 2022/0141445 | A1 | 5/2022 | Malkin et al. |
| 2022/0168899 | A1* | 6/2022 | Boroushaki ........ G06K 19/0723 |
| 2022/0227013 | A1 | 7/2022 | Vu et al. |
| 2022/0234209 | A1 | 7/2022 | Kriveshko et al. |
| 2024/0149455 | A1* | 5/2024 | Mishima ................ B25J 9/1671 |
| 2026/0131805 | A1* | 5/2026 | Zhang ................... B60W 50/06 |

OTHER PUBLICATIONS sick.com. Safety Laser Scanners products page, https://www.sick.com/at/en/safety-laser-scanners/c/g569359?q=:Def_Type:ProductFamily. Retrieved on Mar. 14, 2024, 6 pages.

wideautomation.com. Stereo Safety brochure, https://cdn1.wideautomation.com/media/uploads/2021/02/21114023/brochure-3d-safety-sentinel-web-wide-automation.pdf. Retrieved on Mar. 14, 2024, 4 pages.

veobot.com. Veo Robotics, Inc. website homepage, https://www.veobot.com/. Retrieved on Mar. 14, 2024, 7 pages.

blaxtair.com. Pedestrian & Obstacle Proximity Detection products page, https://blaxtair.com/en/products/blaxtair-pedestrian-obstacle-detection-camera. Retrieved on Mar. 14, 2024, 9 pages.

retenua.com. Emitrace Driver Assistance products page, https://www.retenua.com/en/products/emitrace/index.php. Retrieved on Mar. 14, 2024, 5 pages.

* cited by examiner

SYSTEMS AND METHODS FOR SAFE OPERATION OF ROBOTS

RELATED APPLICATIONS

This application claims the benefit under 35 U.S.C. § 119(e) of U.S. Provisional Patent Application Ser. No. 63/408,893, filed Sep. 22, 2022, and entitled "SYSTEMS AND METHODS FOR SAFE OPERATION OF ROBOTS," the entire contents of which is incorporated herein by reference.

TECHNICAL FIELD

This application relates generally to robotics and more specifically to systems, methods and apparatuses, including computer programs, for determining safety and/or operating parameters for robotic devices.

BACKGROUND

A robot is generally defined as a reprogrammable and multifunctional manipulator designed to move material, parts, tools, and/or specialized devices (e.g., via variable programmed motions) for performing tasks. Robots may include manipulators that are physically anchored (e.g., industrial robotic arms), mobile devices that move throughout an environment (e.g., using legs, wheels, or traction-based mechanisms), or some combination of one or more manipulators and one or more mobile devices. Robots are currently used in a variety of industries, including, for example, manufacturing, warehouse logistics, transportation, hazardous environments, exploration, and healthcare.

SUMMARY

During operation, mobile robots can be hazardous to entities in the environment (e.g., humans or other robots). For example, mobile manipulator robots that are large and powerful enough to move packages from one location to another at high speeds can be dangerous to operators or other workers nearby. In such settings, mobile robots should have systems that protect entities of concern in the environment, e.g., by making sure that they are not dangerously close to the entities while operating at high speeds.

Some embodiments include systems, methods and/or apparatuses, including computer programs, for assigning, to each of a plurality of discrete regions of a safety field around a mobile robot, an "occupancy state" (e.g., "occupied" or "unoccupied"). Such a system may be considered a "stateful" safety system, where entities within the environment of the mobile robot are detected, tagged and/or tracked within the discrete regions of the safety field over time. Such a stateful safety system may enable continuous matching of occluded or partially occluded entities in sensor data enabling continuous tracking of entities in the environment of the robot.

Collectively the set of discrete regions within the safety field may be considered an "occupancy grid." The occupancy state for each region of the occupancy grid may represent whether the region is determined to be occupied and/or potentially occupied (e.g., by a human or other entity). To facilitate safe operation, the mobile robot may take the occupancy states of the regions of the occupancy grid into consideration when controlling operation of the robot. For example, a distance between the robot and one or more regions associated with an occupied state may be used to help determine one or more thresholds or ranges of permitted operating parameters of the robot at a given time (e.g., the fastest allowable safe operating speed for an arm and/or the fastest allowable safe travel speed of a base of the robot at a particular time or interval). One or more operations of the robot can then be constrained according to these thresholds or ranges of permitted operating parameters to facilitate safe operation of the robot in particular environment scenarios.

In some embodiments, the occupancy states of different regions of the occupancy grid may be updated over time. For instance, as more sensor data describing characteristics of the robot's environment is acquired, a region assigned an occupied state may be reassigned to an unoccupied state if sensor data indicates that no entity occupies the region. In this way, the occupancy grid may be temporally updatable, with the regions within the occupancy grid that are associated with an occupied state reflecting the current location of potential safety hazards in the environment of the mobile robot during its operation.

Using such systems and/or methods, the robot can be enabled to maximize its operating efficiency in a given situation subject to the safety constraints that the situation presents. For example, the robot can be allowed to operate at one or more full (e.g., maximum) speeds when the regions of the occupancy grid having an occupied state are sufficiently far from the robot, but may be required to operate at one or more lower speeds (e.g., one or more maximum safe speeds) when such regions are closer to the robot. By updating the occupancy states of the occupancy grid over time, the maximum speed at which the robot is allowed to operate can be modulated as entities of concern and/or the mobile robot move within the environment.

Such systems and methods can lead to lower-cost and faster setup routines than other systems in place today. In some embodiments, the system includes fewer components that may fail over time. In some embodiments, fewer physical touch points exist within the system. In some embodiments, the system has less physical equipment to move (e.g., from bay to bay), reducing the amount of labor-intensive work and/or time required to transition the robot to the next task or area. Some or all of these advantages can lead to greater productivity during operation of the robot.

In one aspect, the invention features a method. The method comprises receiving first sensor data from one or more sensors, the first data being captured at a first time, identifying, based on the first sensor data, a first unobserved portion of a safety field in an environment of a mobile robot, assigning, to each region of a plurality of contiguous regions within the first unobserved portion of the safety field, an occupancy state, updating, at a second time after the first time, the occupancy state of one or more regions of the plurality of contiguous regions within the first unobserved portion of the safety field, and determining, by a computing device, one or more operating parameters for the mobile robot, the one or more operating parameters based, at least in part, on the occupancy state of at least some regions of the plurality of contiguous regions within the first unobserved portion of the safety field at the second time.

In some embodiments, the safety region defines a plane surrounding the mobile robot, and the plurality of contiguous regions within the first unobserved portion of the safety field are two-dimensional (2D) regions arranged within the plane. In some embodiments, the safety region defines a volume surrounding the mobile robot, and the plurality of contiguous regions within the first unobserved portion of the safety field are three-dimensional (3D) regions arranged within the volume. In some embodiments, the plurality of contiguous regions are uniformly spaced within the first unobserved portion of the safety field. In some embodiments, the one or more sensors include at least one sensor coupled to the mobile robot. In some embodiments, the one or more sensors include at least one depth sensor. In some embodiments, the at least one depth sensor includes at least one depth camera. In some embodiments, the plurality of contiguous regions within the first unobserved portion include a first region and a second region, the second region being closer to the mobile robot than the first region within the first unobserved portion of the safety field, and assigning an occupancy state to each of the plurality of contiguous regions within the first unobserved portion of the safety field comprises assigning an occupied state to the first region, and assigning an unoccupied state to the second region.

In some embodiments, the method further comprises identifying, based on the first sensor data, an entity in the safety field, determining based on information about the entity, whether the entity is a whitelisted entity, and ignoring, when it is determined that the entity is a whitelisted entity, the presence of the entity within the safety field when determining the one or more operating parameters for the mobile robot. In some embodiments, the information about the entity indicates that the entity is an object being manipulated by the mobile robot. In some embodiments, the information about the entity indicates that the entity is a portion of the mobile robot. In some embodiments, the information about the entity indicates that the entity is a portion of the environment of the mobile robot. In some embodiments, the information about the entity indicates that the entity is not an entity of concern. In some embodiments, the information about the entity indicates that the entity is another mobile robot. In some embodiments, the information about the entity indicates that the entity is an automated vehicle. In some embodiments, the information about the entity includes information identifying the entity with a particular confidence level, and the entity is determined as a whitelisted entity only when the particular confidence level is above a threshold confidence level. In some embodiments, the threshold confidence level is 99%

In some embodiments, updating, at the second time, the occupancy state of one or more regions of the plurality of contiguous regions within the first unobserved portion of the safety field comprises assigning an occupied state to a first region of the plurality of contiguous regions, the first region having an unoccupied state at the first time, wherein the first region is located adjacent to a second region having an occupied state at the first time. In some embodiments, assigning an occupied state to the first region at the second time is based on elapsed time between first time and the second time. In some embodiments, updating, at the second time, the occupancy state of one or more regions of the plurality of contiguous regions within the first unobserved portion of the safety field further comprises determining based on an entity speed for an entity associated with the second region at the first time, whether it is possible for the entity associated with the second region at the first time to have travelled into the first region at the second time, and assigning an occupied state to the first region only when it is determined that it is possible for the entity associated with the second region at the first time to have travelled into the first region at the second time. In some embodiments, updating, at the second time, the occupancy state of one or more regions of the plurality of contiguous regions within the first unobserved portion of the safety field comprises assigning an occupied state to a third region of the plurality of contiguous regions, the third region having an unoccupied state at the first time, wherein the third region is located adjacent to the first region and is not located adjacent to the second region.

In some embodiments, the method further comprises receiving at or before the second time, second sensor data from the one or more sensors, and identifying, based on the second sensor data, a second unobserved portion of the safety field at the second time, wherein updating, at the second time, the occupancy state of one or more regions of the plurality of contiguous regions within the first unobserved portion of the safety field is based on an overlap between the first unobserved portion and the second observed portion. In some embodiments, updating, at the second time, the occupancy state of one or more regions of the plurality of contiguous regions within the first unobserved portion of the safety field based on an overlap between the first unobserved portion and the second observed portion comprises assigning an unoccupied state to a first region of the plurality of contiguous regions within the first unobserved portion of the safety field having an occupied state at the first time when the first region is not within the second unobserved portion of the safety field. In some embodiments, the plurality of contiguous regions within the first unobserved portion of the safety field include a first region and a second region, the first region having an occupied state at the first time and the second region having an unoccupied state at the first time, the second region being adjacent to the first region in the first unobserved portion of the safety field, and updating, at the second time, the occupancy state of one or more regions of the plurality of contiguous regions within the first unobserved portion of the safety field based on an overlap between the first unobserved portion and the second observed portion comprises assigning an occupied state to the second region when the second region is included within the second unobserved portion of the safety field. In some embodiments, determining one or more operating parameters for the mobile robot comprises instructing the mobile robot to move at least a portion of the mobile robot to enable the one or more sensors to sense the presence or absence of entities in the first region at the second time.

In some embodiments, the one or more sensors include at least one sensor coupled to the mobile robot, and the second sensor data is received from the at least one sensor coupled to the mobile robot. In some embodiments, the one or more sensors include at least one sensor not coupled to the mobile robot, and the second sensor data is received from the at least one sensor not coupled to the mobile robot. In some embodiments, the at least one sensor not coupled to the mobile robot is coupled to another robot in the environment of the mobile robot. In some embodiments, the at least one sensor not coupled to the mobile robot is fixed in the environment of the mobile robot. In some embodiments, the second unobserved portion of the safety field includes a portion of the safety field not within a field of view of any of the one or more sensors at the second time. In some embodiments, at least a portion of the second unobserved portion of the safety field is with the field of view of at least one of the one or more sensors at the first time. In some embodiments, the second unobserved portion of the safety field includes a portion of the safety field in a blind spot of the one or more sensors created by one or more objects in the safety field at the second time.

In some embodiments, determining one or more operating parameters for the mobile robot comprises determining a trajectory plan for an arm of the mobile robot. In some embodiments, determining one or more operating parameters for the mobile robot comprises instructing the mobile robot to alter a speed of motion of at least a portion of the mobile robot. In some embodiments, determining one or more operating parameters for the mobile robot comprises determining the one or more operating parameters further based, at least in part, on a distance between the mobile robot and a first region of the plurality of contiguous regions within the first unobserved portion of the safety field having an occupied state at the second time.

In some embodiments, at the second time, the plurality of contiguous regions of the first unobserved portion of the safety field includes multiple regions, including the first region, having an occupied state, and the first region is a closest region of the multiple regions to the mobile robot. In some embodiments, assigning, to each region of a plurality of contiguous regions within the first unobserved portion of the safety field, an occupancy state comprises assigning an occupied state to at least one region of the plurality of contiguous regions at a boundary of the safety field within the first unobserved portion of the safety field. In some embodiments, the first unobserved portion of the safety field includes a portion of the safety field not within a field of view of any of the one or more sensors at the first time. In some embodiments, the first unobserved portion of the safety field includes a portion of the safety field in a blind spot of the one or more sensors created by one or more objects in the safety field at the first time. In some embodiments, the one or more sensors include at least one first sensor coupled to the mobile robot and at least one second sensor not coupled to the mobile robot, and the first unobserved portion of the safety field includes a portion of the safety field not observable by the at least one first sensor or the at least one second sensor.

In some embodiments, the safety field includes a restricted zone around the robot and a monitored zone located outside of the restricted zone and the method further comprises detecting an entity located in the monitored zone that has not yet entered the restricted zone, determining whether the entity is an entity of concern, and determining the one or more operating parameters for the mobile robot based, at least in part, on whether the entity is an entity of concern. In some embodiments, the method further comprises determining whether the entity is moving toward the restricted zone, wherein determining the one or more operating parameters for the mobile robot is further based, at least in part, on whether the entity is moving toward the restricted zone.

In one aspect, the invention features a non-transitory computer-readable medium encoded with a plurality of instructions that, when executed, by at least one computer processor, perform any of the methods described herein.

In one aspect, the invention features a mobile robot. The mobile robot comprises one or more sensors configured to sense first sensor data at a first time, and at least one computer processor. The at least one computer processor is programmed to perform a method of identifying, based on the first sensor data, a first unobserved portion of a safety field in an environment of the mobile robot, assigning, to each region of a plurality of contiguous regions within the first unobserved portion of the safety field, an occupancy state, updating, at a second time after the first time, the occupancy state of one or more regions of the plurality of contiguous regions within the first unobserved portion of the safety field, and determining one or more operating parameters for the mobile robot, the one or more operating parameters based, at least in part, on the occupancy state of at least some regions of the plurality of contiguous regions within the first unobserved portion of the safety field at the second time.

In some embodiments, the at least one computer processor is further programmed to perform any of the methods described herein. In some embodiments, the one or more sensors include at least one camera. In some embodiments, the one or more sensors include at least one LIDAR sensor. In some embodiments, the method further comprises a base having a top surface, a bottom surface and a plurality of sides arranged between the top surface and the bottom surface, and a manipulator arm coupled to the top surface of the base, wherein the one or more sensors include at least one camera coupled to each side of the plurality of sides of the base.

In one aspect, the invention features a safety system for a mobile robot. The safety system comprises one or more onboard sensors coupled to the mobile robot, one or more off-robot sensors not coupled to the mobile robot, and at least one computer processor. The at least one computer processor is programmed to perform a method of identifying, based on first sensor data sensed at a first time by the one or more onboard sensors and/or the one or more off-robot sensors, a first unobserved portion of a safety field in an environment of the mobile robot, assigning, to each region of a plurality of contiguous regions within the first unobserved portion of the safety field, an occupancy state, updating, at a second time after the first time, the occupancy state of one or more regions of the plurality of contiguous regions within the first unobserved portion of the safety field, and determining one or more operating parameters for the mobile robot, the one or more operating parameters based, at least in part, on the occupancy state of at least some regions of the plurality of contiguous regions within the first unobserved portion of the safety field at the second time.

In some embodiments, the at least one computer processor is further programmed to perform any of the methods described herein. In some embodiments, the at least one computer processor is coupled to the mobile robot. In some embodiments, the one or more off-robot sensors are coupled to another robot in the environment of the mobile robot. In some embodiments, the one or more off-robot sensors are fixed in the environment of the mobile robot.

In one aspect, the invention features a method. The method comprises identifying, based on first sensor data sensed by one or more sensors at a first time, a first unobserved portion of a safety field in an environment of a mobile robot, assigning, to each region of an occupancy grid that includes a first plurality of contiguous regions within the first unobserved portion of the safety field, an occupancy state, identifying, based on second sensor data sensed by the one or more sensors at a second time following the first time, a second unobserved portion of the safety field, updating the occupancy state of at least one region of the occupancy grid based at least in part, on the first unobserved portion and the second unobserved portion to provide an updated occupancy grid, determining, by a computing device, one or more operating parameters for the mobile robot, the one or more operating parameters based, at least in part, on the updated occupancy grid.

In some embodiments, updating the occupancy state of at least one region of the occupancy grid based at least in part, on the first unobserved portion and the second unobserved portion comprises changing an occupancy state of a first region of the occupancy grid within the first unobserved portion to an unoccupied state when the first region is not included within the second unobserved portion. In some embodiments, updating the occupancy state of at least one region of the occupancy grid based at least in part, on the first unobserved portion and the second unobserved portion comprises changing an occupancy state of a first region of the occupancy grid within the first unobserved portion to an occupied state when the first region is included within the second unobserved portion, wherein the first region is adjacent to a second region of the occupancy grid within the first unobserved region, the second region having assigned an occupied state.

In one aspect, the invention features a method. The method comprises receiving, by a computing device, an occupancy grid for a safety field of a mobile robot, the occupancy grid including at least one uncertainty region within which an entity of concern may be located, muting one or more whitelisted entities in the safety field, determining one or more unobserved regions of the occupancy grid, wherein the one or more unobserved regions are formed by the one or more muted entities and/or correspond to regions outside the field of view of one or more sensors configured to sense objects within the safety zone, updating the at least one uncertainty region based on received sensor data, and determining, by a computing device, one or more operating parameters for the mobile robot, the one or more operating parameters based, at least in part, on a distance between the mobile robot to the updated at least one uncertainty region.

In one aspect, the invention features a method. The method comprises receiving, by a computing device, a state of a region of an environment of a mobile robot, determining a largest distance away from the mobile robot that is clear along all approach corridors within the region, muting one or more onboard sensors of the mobile robot and one or more whitelisted entities as or before the one or more whitelisted entities create occlusions in the region, determining a safe operating time limit and one or more operating parameters of the mobile robot based on an approach speed of an entity of concern outside of the region and the largest distance, and unmuting the one or more onboard sensors of the mobile robot when the safe operating time limit is reached or when the one or more whitelisted entities clear the region.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

DETAILED DESCRIPTION

Figure 1A:
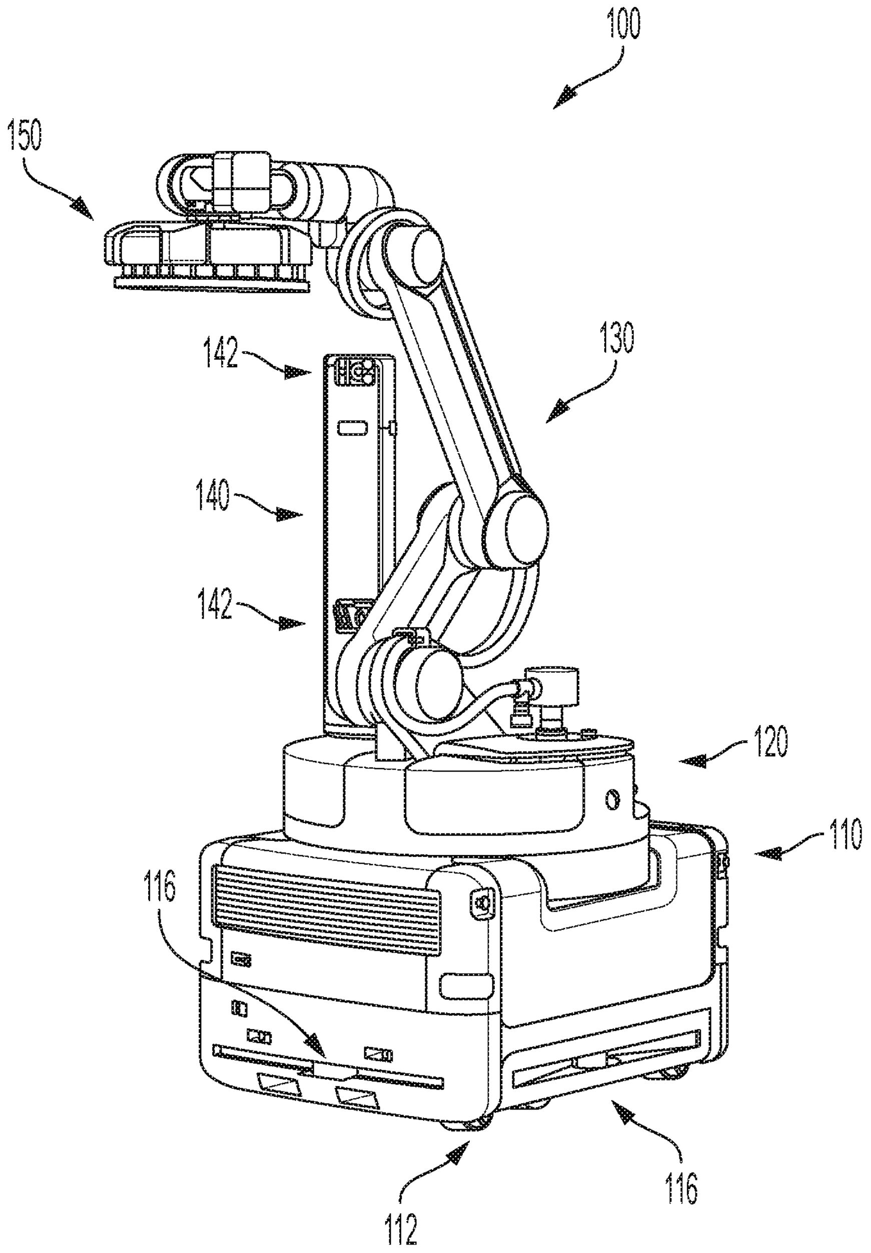
FIGS. 1A and 1B are perspective views of a robot, according to an illustrative embodiment of the invention.

In some conventional robot systems, a safety field for the robot is created using information from sensor data captured at a single point in time. Based on the captured sensor data, it may be determined whether an object is located within the safety field, and if so, the operation of the robot may be changed (e.g., slowed or stopped altogether) to avoid collision of the robot with the detected object. The inventors have recognized and appreciated that slowing or halting operation of a robot whenever an object is detected within a certain distance from the robot may not strictly be necessary to ensure safe operation of the robot within its environment. Rather, such an overly conservative approach may result in the robot performing tasks slower or not at all, even though safe operation of the robot may be achievable under a particular scenario. To this end, some embodiments of the present technology improve upon existing techniques for ensuring safe operation of mobile robot in environment by assigning to each of a plurality of distinct contiguous regions of a safety field around the robot, an occupancy state, which indicates whether an entity is possibly present within the region. The collection of regions form an "occupancy grid" which covers the safety field. The occupancy states of the regions in the occupancy grid can be updated over time, and one or more operations and/or operating parameters of the robot can be modified accordingly to facilitate safe operation of the robot with high confidence.

Robots can be configured to perform a number of tasks in an environment in which they are placed. Exemplary tasks may include interacting with objects and/or elements of the environment. Notably, robots are becoming popular in warehouse and logistics operations. Before robots were introduced to such spaces, many operations were performed manually. For example, a person might manually unload boxes from a truck onto one end of a conveyor belt, and a second person at the opposite end of the conveyor belt might organize those boxes onto a pallet. The pallet might then be picked up by a forklift operated by a third person, who might drive to a storage area of the warehouse and drop the pallet for a fourth person to remove the individual boxes from the pallet and place them on shelves in a storage area. Some robotic solutions have been developed to automate many of these functions. Such robots may either be specialist robots (i.e., designed to perform a single task or a small number of related tasks) or generalist robots (i.e., designed to perform a wide variety of tasks). To date, both specialist and generalist warehouse robots have been associated with significant limitations.

For example, because a specialist robot may be designed to perform a single task (e.g., unloading boxes from a truck onto a conveyor belt), while such specialized robots may be efficient at performing their designated task, they may be unable to perform other related tasks. As a result, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, while a generalist robot may be designed to perform a wide variety of tasks (e.g., unloading, palletizing, transporting, depalletizing, and/or storing), such generalist robots may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible.

Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task.

In such systems, the mobile base and the manipulator may be regarded as effectively two separate robots that have been joined together. Accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while certain limitations arise from an engineering perspective, additional limitations must be imposed to comply with safety regulations. For example, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not threaten the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, a highly integrated mobile manipulator robot with system-level mechanical design and holistic control strategies between the manipulator and the mobile base may provide certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
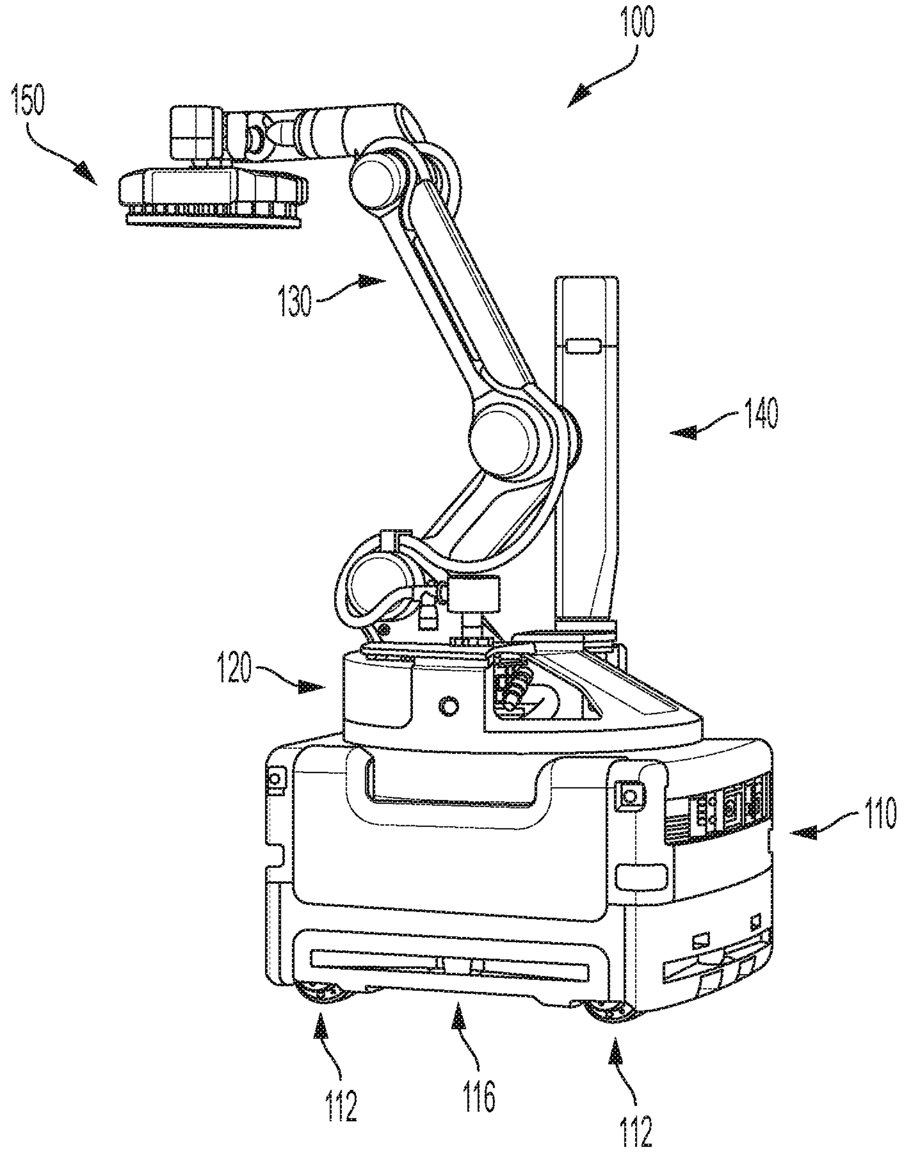

FIGS. 1A and 1B are perspective views of a robot 100, according to an illustrative embodiment of the invention. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
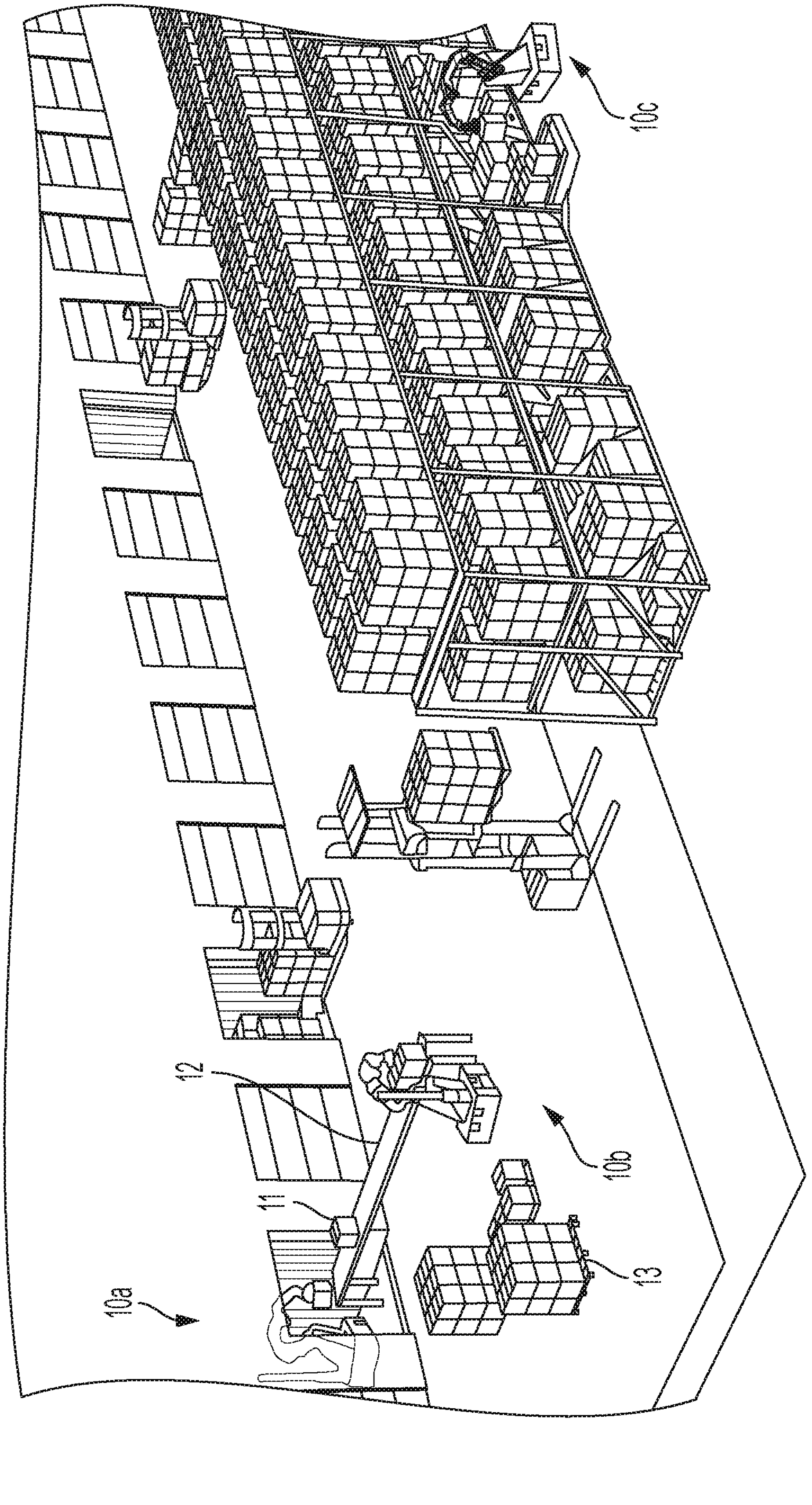
FIG. 2A depicts robots performing different tasks within a warehouse environment, according to an illustrative embodiment of the invention.

FIG. 2A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 2C). The robots 10*a*, 10*b*, and 10*c* can be different instances of the same robot or similar robots. Accordingly, the robots described herein may be understood as specialized multi-purpose robots, in that they are designed to perform specific tasks accurately and efficiently, but are not limited to only one or a small number of tasks.

Figure 2B:
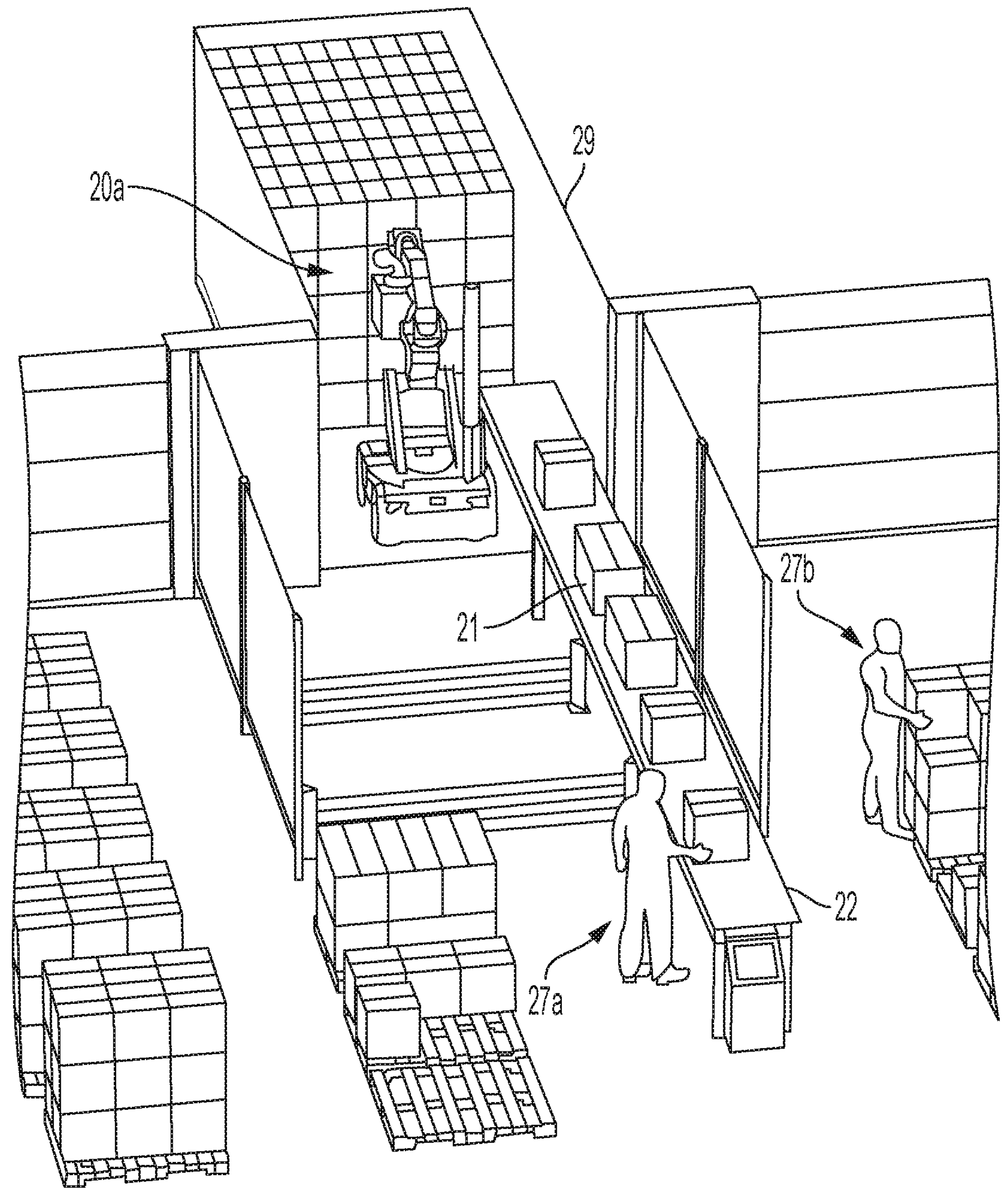
FIG. 2B depicts a robot unloading boxes from a truck and placing them on a conveyor belt, according to an illustrative embodiment of the invention.

FIG. 2B depicts a robot 20*a* unloading boxes 21 from a truck 29 and placing them on a conveyor belt 22. In this box picking application (as well as in other box picking applications), the robot 20*a* repetitiously picks a box, rotates, places the box, and rotates back to pick the next box. Although robot 20*a* of FIG. 2B is a different embodiment from robot 100 of FIGS. 1A and 1B, referring to the components of robot 100 identified in FIGS. 1A and 1B will ease explanation of the operation of the robot 20*a* in FIG. 2B.

During operation, the perception mast of robot 20*a* (analogous to the perception mast 140 of robot 100 of FIGS. 1A and 1B) may be configured to rotate independently of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety field around the robot (e.g., into which humans are prevented from entering and/or which are associated with other safety controls, as explained in greater detail below).

Figure 2C:
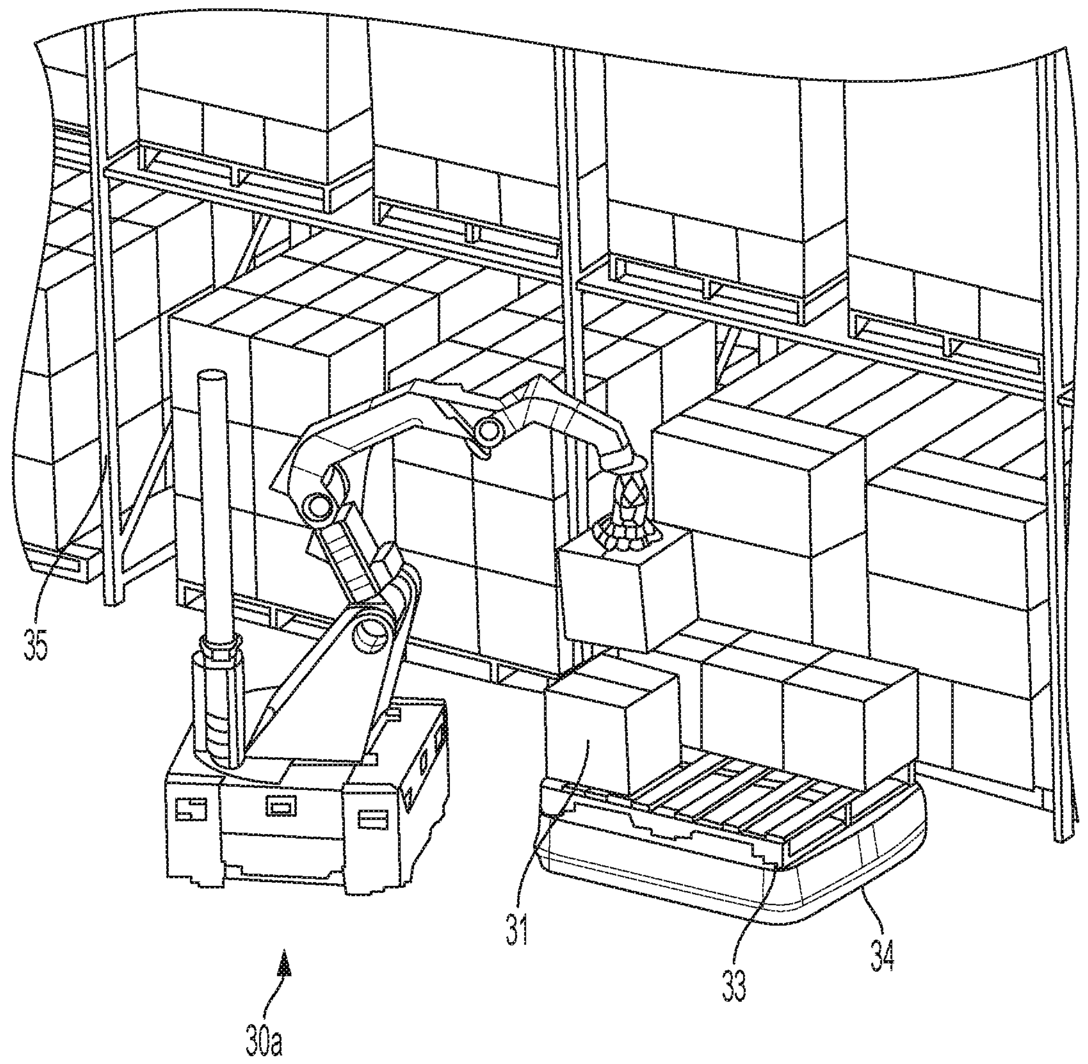
FIG. 2C depicts a robot performing an order building task in which the robot places boxes onto a pallet, according to an illustrative embodiment of the invention.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

The tasks depicted in FIGS. 2A-2C are only a few examples of applications in which an integrated mobile manipulator robot may be used, and the present disclosure is not limited to robots configured to perform only these specific tasks. For example, the robots described herein may be suited to perform tasks including, but not limited to: removing objects from a truck or container; placing objects on a conveyor belt; removing objects from a conveyor belt; organizing objects into a stack; organizing objects on a pallet; placing objects on a shelf; organizing objects on a shelf; removing objects from a shelf; picking objects from the top (e.g., performing a "top pick"); picking objects from a side (e.g., performing a "face pick"); coordinating with other mobile manipulator robots; coordinating with other warehouse robots (e.g., coordinating with AMRs); coordinating with humans; and many other tasks.

Example Robotic Arm

Figure 3:
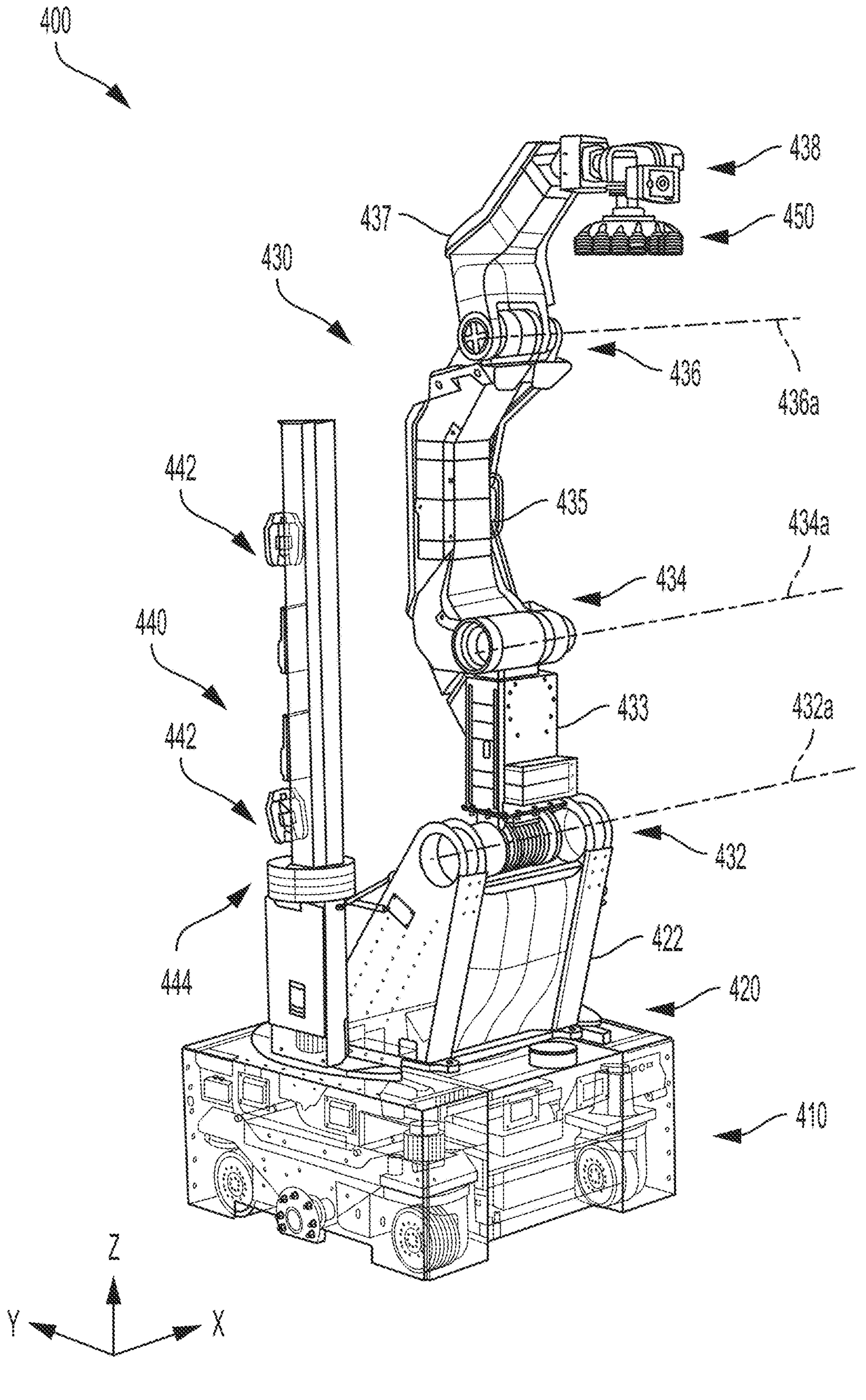
FIG. 3 is a perspective view of a robot, according to an illustrative embodiment of the invention.

FIG. 3 is a perspective view of a robot 400, according to an illustrative embodiment of the invention. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 3 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist.

Starting at the turntable 420, the robotic arm 430 includes a turntable offset 422, which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432*a*, 434*a*, and 436*a*, respectively.

The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432*a* associated with the first joint 432, the second actuator is configured to rotate the second link 435 about the second axis 434*a* associated with the second joint 434, and the third actuator is configured to rotate the third link 437 about the third axis 436*a* associated with the third joint 436. In the embodiment shown in FIG. 3, the first, second, and third axes 432*a*, 434*a*, and 436*a* are parallel (and, in this case, are all parallel to the X axis). In the embodiment shown in FIG. 3, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. A robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

Returning to FIG. 3, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, an end effector may be associated with one or more sensors. For example, a force/torque sensor may measure forces and/or torques (e.g., wrenches) applied to the end effector. Alternatively or additionally, a sensor may measure wrenches applied to a wrist of the robotic arm by the end effector (and, for example, an object grasped by the end effector) as the object is manipulated. Signals from these (or other) sensors may be used during mass estimation and/or path planning operations. In some embodiments, sensors associated with an end effector may include an integrated force/torque sensor, such as a 6-axis force/torque sensor. In some embodiments, separate sensors (e.g., separate force and torque sensors) may be employed. Some embodiments may include only force sensors (e.g., uniaxial force sensors, or multi-axis force sensors), and some embodiments may include only torque sensors. In some embodiments, an end effector may be associated with a custom sensing arrangement. For example, one or more sensors (e.g., one or more uniaxial sensors) may be arranged to enable sensing of forces and/or torques along multiple axes. An end effector (or another portion of the robotic arm) may additionally include any appropriate number or configuration of cameras, distance sensors, pressure sensors, light sensors, or any other suitable sensors, whether related to sensing characteristics of the payload or otherwise, as the disclosure is not limited in this regard.

Figure 4A:
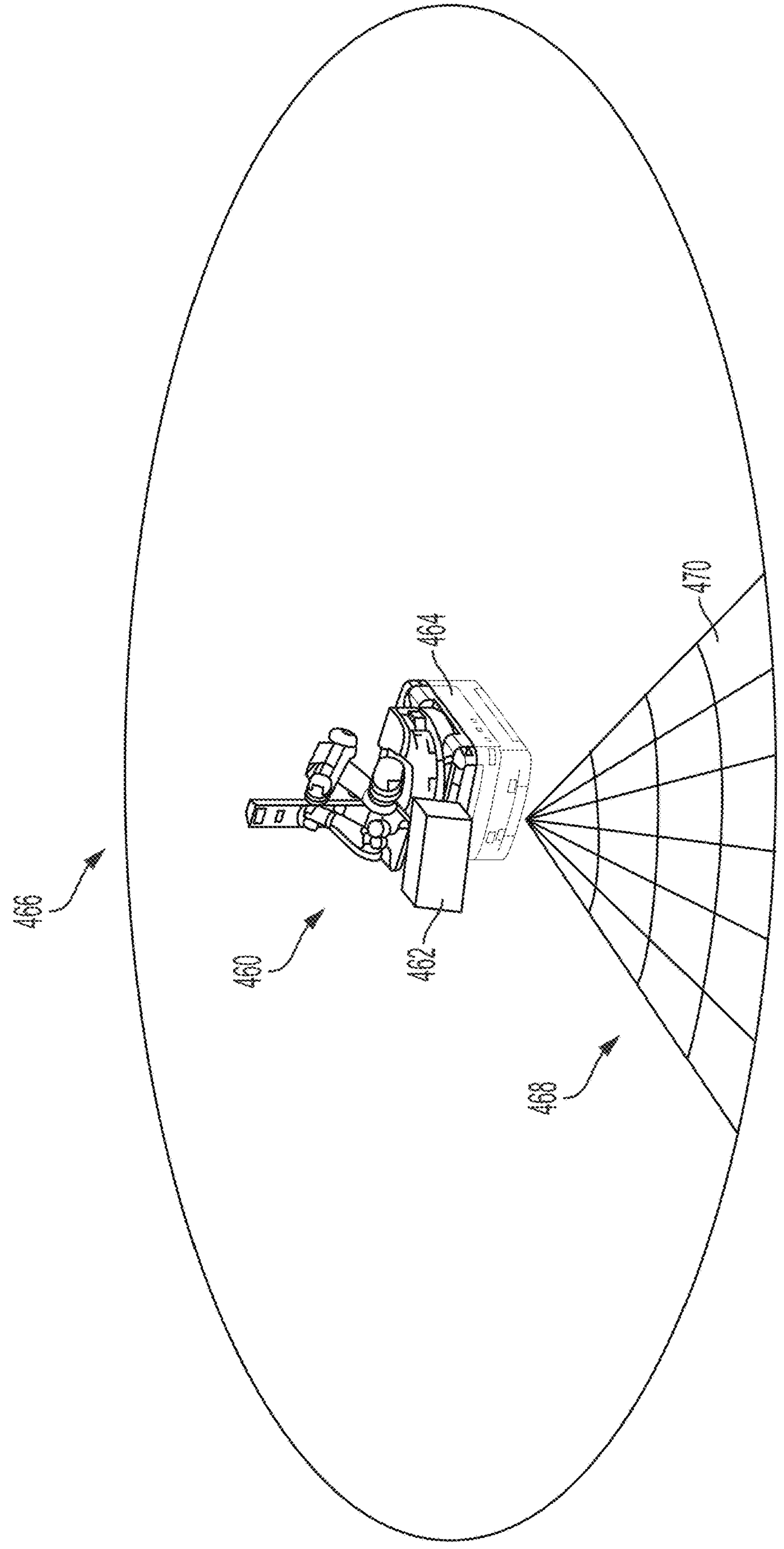
FIG. 4A is a schematic view of a robot having a safety field around the robot, according to an illustrative embodiment of the invention.

FIG. 4A schematically shows a robot 460 configured to operate within an environment (e.g., a warehouse). As shown in FIG. 4A, robot 460 is configured to manipulate an object 462 (e.g., a parcel, box or other object) using a manipulator arm and a gripper coupled to a base of the robot 460. For instance robot 460 may be implemented as robot 100 described in connection with FIGS. 1A and 1B, robot 400 described in connection with FIG. 3, or any other suitable mobile robot. Robot 460 includes one or more onboard sensors 464 arranged to capture information about objects in the environment of the robot 460. For instance, onboard sensors 464 may include one or more cameras, LIDAR sensors, RADAR sensors, RF sensors, laser range finding sensors, and/or Bluetooth sensors. In some embodiments, onboard sensors 464 include a plurality of LIDAR sensors configured to provide a 360 degree view around the base of the robot 460 in a 2D plane near a ground plane on which the robot 460 travels within the environment. In some embodiments, onboard sensors 464 additionally or alternatively includes one or more cameras arranged on the robot 460 and configured to provide 2D or 3D sensing of objects in the environment of the robot 460. For instance, the base of the robot 460 460 may have four sides (as shown, for example, with robot 100 of FIG. 1A), with a LIDAR sensor arranged on each of the four sides of the base. Additionally, a 3D camera may be arranged on each of the four sides of the base near a corresponding LIDAR sensor to provide 3D sensing of objects within a safety volume that surrounds the robot 460. It should be appreciated that onboard sensors 464 may be located on parts of the mobile robot 460 other than the base, and embodiments of the present invention are not limited in this respect.

The environment of robot 460 includes a safety field 466 within which the onboard sensors 464 may be configured to monitor for the presence of entities (e.g., humans, other robots or vehicles, environment features (e.g., walls)). As shown, safety field 466 includes a 2D plane segmented using an occupancy grid 468 having a plurality of contiguous regions 470. The regions 470 of the occupancy grid 468 may be defined to have a sufficiently small size such that safety critical behavior of the mobile robot 460 can rely on it. For example, in some embodiments, the maximum size of a region of the occupancy grid may correspond to the average size of a human head, the average width of a human leg or another measurement of a human or other entity of concern.

Each of the regions 470 may be associated with an occupancy state representing the presence or absence of a possible entity within the region, and the occupancy state may be updated over time, to enable the robot 460 to operate safely within the safety field 466 with high confidence. Combining entity detections in an occupancy grid 468 with temporal models as described herein enables one or more operations of the robot 460 and/or other automated entities within the safety field 466 (e.g., automated guided vehicles, other robots) to be modified to improve safe operation of the robot 460.

Figure 8A:
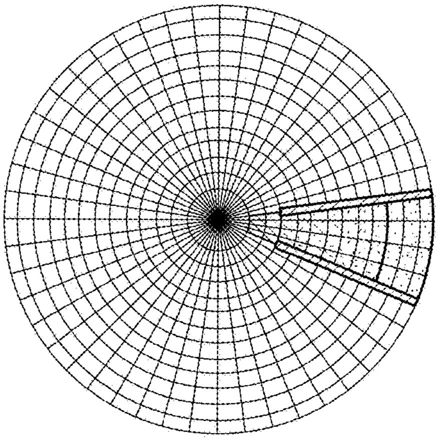
FIGS. 8A-8D illustrate example configurations of occupancy grids that may be used according to some embodiments of the invention.
Figure 8B:
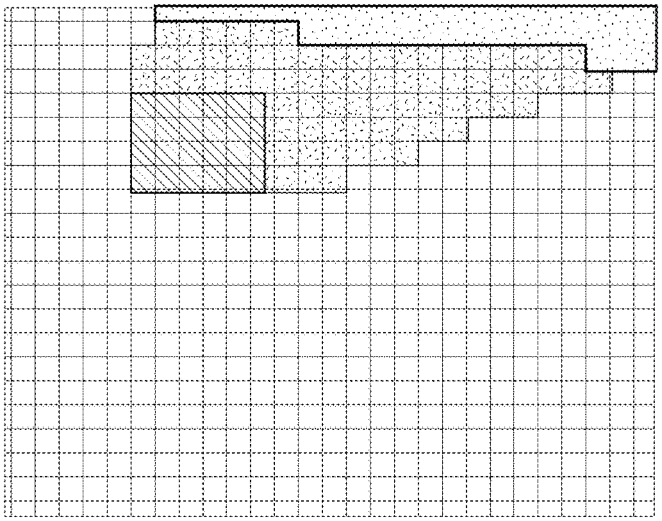
Figure 8C:
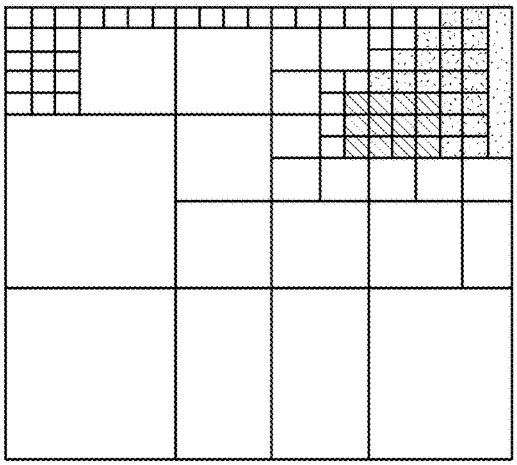
Figure 8D:
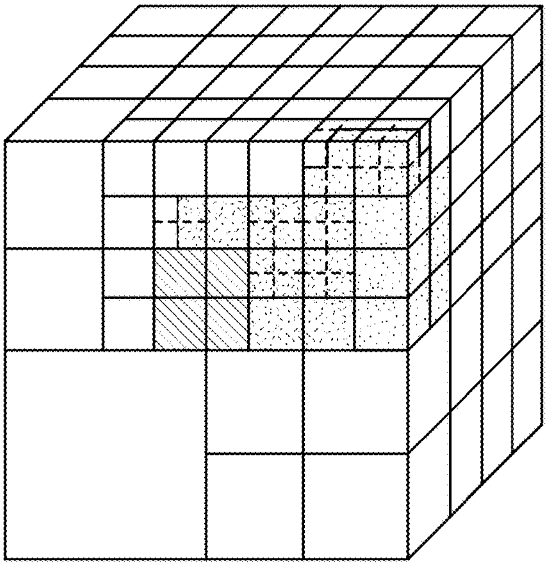

It should be appreciated that although only a portion of occupancy grid 468 is shown in FIG. 4A, the occupancy grid may extend through the entirety of the safety field 466 to cover an area completely surrounding the robot 460. Additionally, occupancy grid 468 is shown in FIG. 4A as being represented within a two-dimensional (2D) plane corresponding to safety field 466, with regions 470 being 2D regions within the plane. However, it should be appreciated that occupancy grid 468 may alternatively be implemented as a three-dimensional (3D) volume surrounding robot 460, with the regions 470 representing discrete and contiguous 3D volumes within a 3D safety field 466. Use of a 3D occupancy grid may be particularly useful when the robot 460 is navigating and/or operating within complex and/or cluttered environments. For instance, use of a 3D occupancy grid may facilitate operation of the robot 460 in an environment that includes overhanging elements, which would not be detected with a 2D sensing system configured to detect objects near the ground plane of the robot 460. A non-limiting example of a 3D occupancy grid is shown in FIG. 8D. In a further extension, the occupancy grid may be considered in terms of a robot platform that moves not only within a 2D plane (e.g., along a flat ground plane such as a floor of a warehouse), but also is configured to move vertically over objects (e.g., a mobile robot with legs configured to traverse stairs). In such a scenario, the occupancy grid may be adjusted at each sensor data capture time to accommodate for complex (e.g., 6 degree of freedom) movements of the onboard sensors coupled to the robot 460 with respect to a world frame of the environment (e.g., by performing a ground plane adjustment).

The regions 470 are shown in FIG. 4A as being uniformly spaced within the occupancy grid 468. However, it should be appreciated that regions 470 may be arranged within occupancy grid 468 in any suitable way. For instance, the portion of the occupancy grid closer to robot 460 may include regions 470 that are more closely spaced than the portion of the occupancy grid farther away from the robot 460.

The coordinates of the regions 470 in occupancy grid 468 may be defined with respect to any suitable reference frame. In the example of FIG. 4A, the regions of the occupancy grid are defined in a robot reference frame, with the robot 460 at the origin. Defining the occupancy grid 468 with respect to the robot reference frame may facilitate the use of sensor data captured by onboard sensors 464 to determine occupancy states for regions 470 of the occupancy grid 468 because, for example, the sensor data from onboard sensors 464 is also defined with respect to the robot reference frame. For instance, when the onboard sensors 464 are arranged to sense entities within the entire safety field 466, sensor data captured by onboard sensors 464 may be used directly (e.g., without coordinate transformation) to determine an occupancy state of each of the regions 470 of the occupancy grid 468. By not requiring coordinates of the sensor data to be transformed into a different reference frame, uncertainties associated with such a coordinate transform may not need to be accounted for, thereby improving the reliability of the safety system.

Although the occupancy grid 468 is shown as being defined in FIG. 4A with reference to a robot reference frame, it should be appreciated that any suitable reference frame may be used to define the coordinates of the occupancy grid 468 and the regions 470 therein. For instance, in some embodiments, a global reference frame defined with respect to a particular environment, such a warehouse or a portion of a warehouse (e.g., using global positioning satellite (GPS) coordinates, or some other coordinate system) may be used to define the coordinates of the occupancy grid 468 and its regions.

FIG. 4A illustrates a scenario in which the object 462 being manipulated by robot 460 at a first time does not occlude any portion of the field of view of the onboard sensors 464, which are configured to determine whether entities are located within a 2D plane surrounding the robot 460 near a ground plane on which the robot 460 travels. In such a scenario, the sensors 464 are able to capture a full 360-degree view surrounding the robot 460 to determine that no entities exist within safety field 466, and as such, each of the regions 470 in the occupancy grid 468 may be assigned an occupancy state of "unoccupied." Because no entities have been detected within the safety field 466, the robot 460 may be permitted to operate at the first time without restriction (e.g., at full safe operating speed).

Figure 4B:
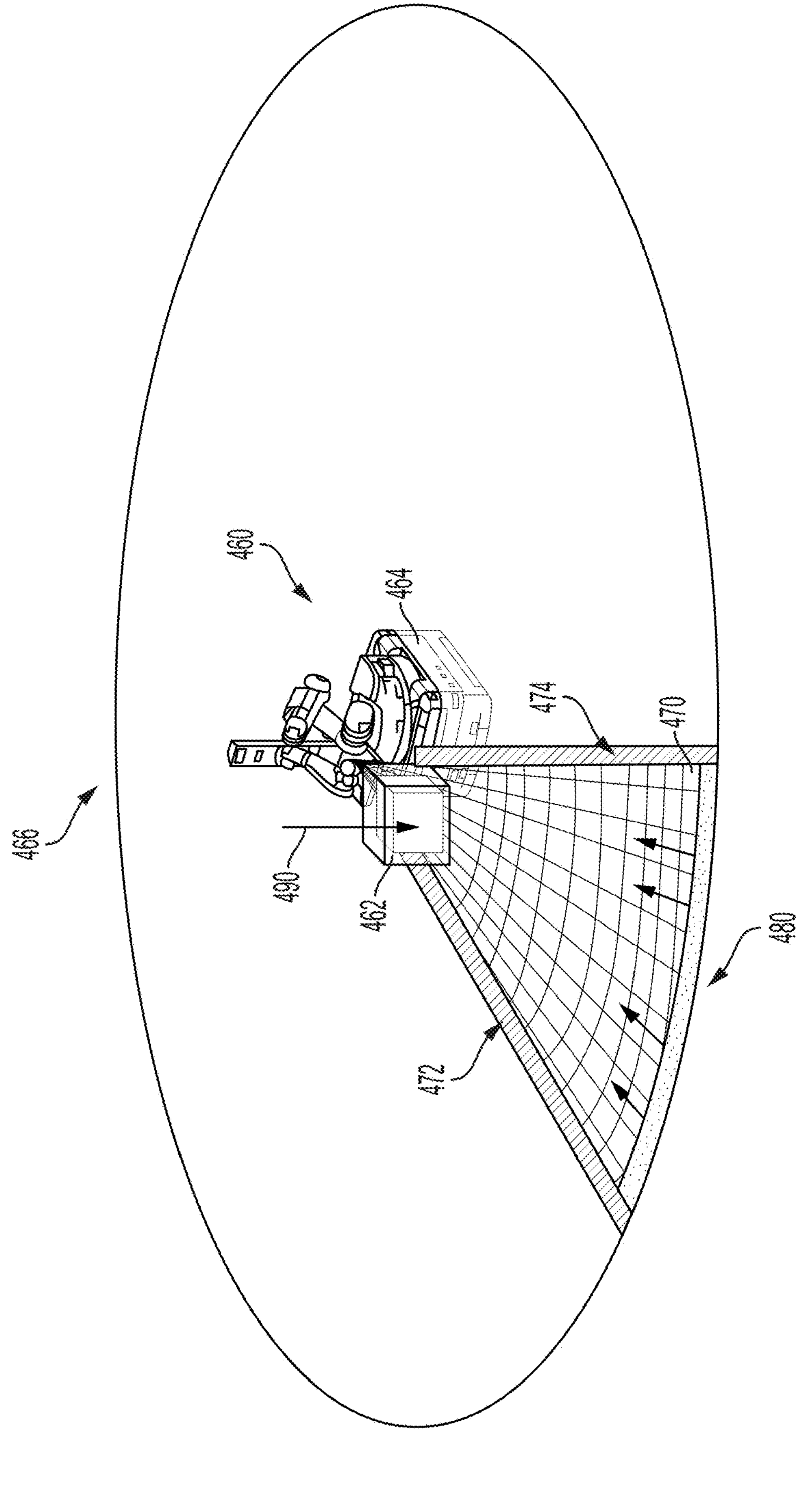
FIG. 4B is a schematic view of a robot manipulating an object that occludes a portion of a field of view of an onboard sensor within a safety field of the robot, according to an illustrative embodiment of the invention.

FIG. 4B illustrates a scenario in which the object 462 being manipulated by robot 460 at a second time has been moved downward as indicated by arrow 490. As shown in FIG. 4B at the second time the object 462 occludes a portion of the field of view of the sensors 464, resulting in a "blind spot" for the sensors 464 within the safety field 466. The blind spot is bounded by the observed boundaries 472, 474 and extends from the robot 460 outward to the edge of the safety field 466. In some embodiments, regions 470 of the occupancy grid 468 that fall within a blind spot of the robot 460 due to an occlusion of the field of view of the onboard sensors 464 may be assigned a state (e.g., "recently empty") that distinguishes those regions from other regions 470 of the occupancy grid 468, which are not currently in a blind spot. As described in more detail, in some embodiments, only regions 470 within a current blind spot region of the occupancy grid 468 may be considered for assignment of a state of "occupied," with regions 470 not currently in a blind spot region being assigned a state of "unoccupied."

Although the entire blind spot region shown in FIG. 4B cannot be observed by the onboard sensors 464 at the second time, the inventors have recognized and appreciated that, from a safety perspective, only a portion of blind spot region may need to be considered as possibly having an entity located therein at the second time based, at least in part, on assumptions about entity behavior within the environment of the robot 460. For instance, assuming that the scenario depicted in FIG. 4B (at the second time) occurred shortly after the scenario depicted in FIG. 4A (at the first time when the entire safety field 466 was clear), it may be assumed that at the second time, the regions of the occupancy grid 468 closest to robot 460 that fall within the blind spot caused by object 462 will not have an entity located therein based on the speed that entities (e.g., humans) travel in the environment of the robot 460. However, as shown in FIG. 4B, it is possible that an entity (e.g., a person) may have entered the safety field 466 along the boundary of the safety field within the blind spot region. Because such a boundary is not observable by the sensors 464 of the robot 460 it is referred to herein as a "blind boundary." To account for the possibility that an entity entered the safety field 466 at the blind boundary, one or more regions 470 of the occupancy grid located within the blind spot region along the blind boundary may be assigned an occupancy state of "occupied," thereby forming an uncertainty region 480 within the safety field 466, within which the robot 460 is uncertain of the presence or absence of an entity. Based on the distance between the uncertainty region 480 (e.g., the closest region 470 within the uncertainty region 480) and the robot 460, one or more operations of the robot 460 may be modified to facilitate its safe operation.

As described above, in the scenario shown in FIG. 4B, the object 462 is detectable within the field of view of the sensors 464. To prevent the object 462 from itself being mistaken as an entity in the safety field 466, and consequently triggering shutdown of the operation of the robot 460, some embodiments are configured to selectively ignore particular objects detected in the safety field 466 for the purpose of the safety determinations described herein. The robot 460 may have knowledge about its own components including the dimensions, trajectory plan, and speed of its manipulator arm and one or more objects currently being manipulated by the robot 460. Accordingly, such components or objects, when detected in the safety field 466 may be safely ignored or "muted" within the safety field 466 for purposes of safety calculations, examples of which are described herein (e.g., the distance between muted objects and the robot 460 may not be considered when determining whether to change operation of the robot 460). Objects may be muted in any suitable way. For instance, the regions 470 of the occupancy grid corresponding to the location of the muted object may be assigned a state of "unoccupied" or "muted," such that the safety calculations do not consider a distance to such regions. As described in more detail below, entities or objects detected in safety field 466 other than components of the robot 460 itself (e.g., its manipulator arm) or objects being manipulated by the robot 460 may also be muted in some embodiments. Such objects may be added to a "whitelist" of known objects, which may be ignored for the purpose of safety calculations even though they may be detected in the safety field 466.

Figure 4C:
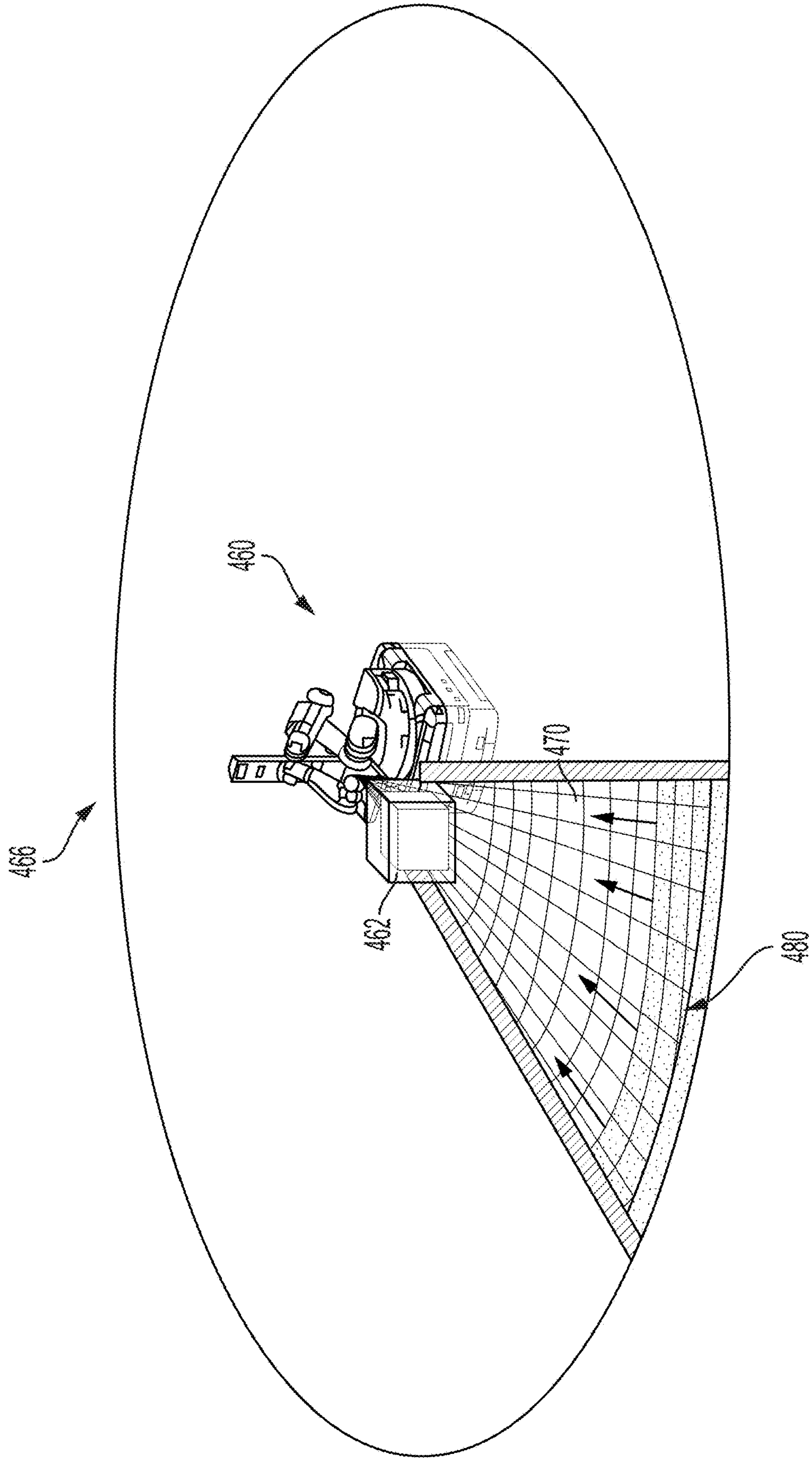
FIG. 4C is a schematic view of temporally updating regions in an occupancy grid within a safety field of a robot, according to an illustrative embodiment of the invention.

FIG. 4C illustrates a scenario in which the object 462 being manipulated by robot 460 at a third time following the second time remains in the same position as in the scenario depicted in FIG. 4B. In this scenario although the object 462 has not moved from the second time (FIG. 4B) to the third time (FIG. 4C), and thus the blind spot in the safety field at the third time is the same as at the second time, the size of the uncertainty region 480 has grown due to the time elapsed from the second time to the third time. In particular, additional regions 470 located adjacent to the regions included in the uncertainty region 480 at the second time (FIG. 4B) have been added in the uncertainty region 480 at the third time (FIG. 4C) to account for the possibility that an entity that entered near the blind boundary of the safety field 466 has continued moving toward the robot 460 during the time elapsed between the second time and the third time, as shown by the arrows in FIG. 4C. The number of additional regions 470 added to the uncertainty region 480 at the third time relative to the second time may depend on a speed (e.g., a top walking speed) associated with entities in the environment of the robot 460. While the object 462 remains stationary or within the field of view of the onboard sensors 464, and as more time elapses, the uncertainty region 480 may continue to grow toward the robot 460, which may in turn result in modifications to the operation of the robot 460 based, at least in part, on the distance between the updated uncertainty region 480 and the robot 460, as discussed above.

As described herein, modification of one or more operating parameters (e.g., velocity, configuration, direction of motion, time-to-stop) of a mobile robot may be determined, at least in part, on a location of an uncertainty region within an occupancy grid for a safety field of the mobile robot. Accordingly, to enable the mobile robot to have maximum operating flexibility, it may be desirable to increase the maximum operating space of the mobile robot within the safety field by decreasing the size of the uncertainty region during operation of the mobile robot. In some embodiments, increasing the operating flexibility of the robot 460 by reducing the size of the uncertainty region may be achieved by removing or "clearing" regions 470 from the uncertainty region 480 as additional information about entities within the safety field 466 is received.

In the example scenario described in FIG. 4B, an object being manipulated by the robot 460 occludes a portion of a field of view of the sensors 464, resulting in a blind spot region of the safety field 466, and the resulting uncertainty region 480 within the blind spot region. In the example scenario described in FIG. 4C the object being manipulated by the robot 460 remains stationary, but the uncertainty region 480 grows inward toward the robot 460 due to the passage of time. Reducing the size of the uncertainty region 480 is achieved in some embodiments by moving the object being manipulated by the robot 460 such that the object (and/or a component of the robot 460 itself), which previously occluded the field of view of the onboard sensors 464 of the robot 460, no longer occludes the field of view of the sensors.

Figure 5C:
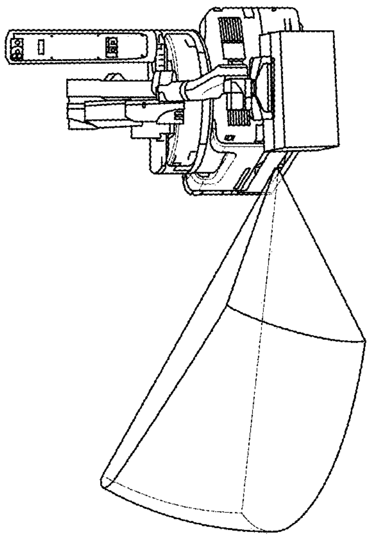
FIGS. 5A-5C schematically illustrate a robot manipulating an object according to a trajectory plan through a field of view of an onboard sensor, according to an illustrative embodiment of the invention.
Figure 5B:
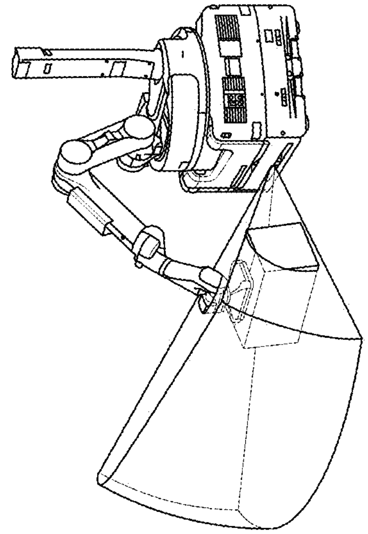
Figure 5A:
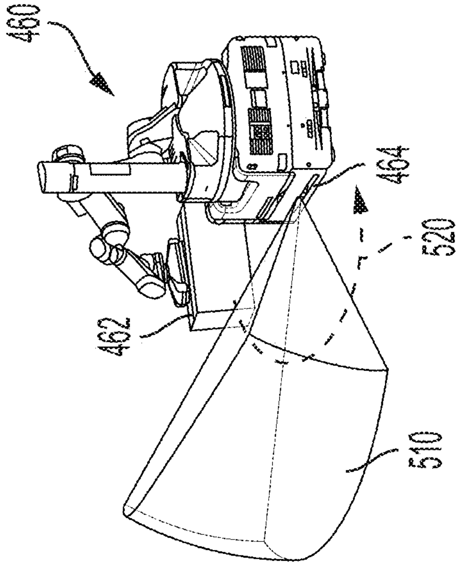

FIGS. 5A-5C schematically illustrate a trajectory path for a manipulator arm of a robot in which an object being manipulated by the robot moves into then out of the field of view of an onboard sensor of the robot configured to detect entities in a safety field around the robot. FIG. 5A shows the robot 460 at a first time when object 462 manipulated by the robot is outside of the field of view 510 of the onboard sensor 464. As such, at the first time, the object 462 does not occlude the field of view 510 of the sensor 464, resulting in no blind spot region being created with respect to sensor 464. FIG. 5A also shows the trajectory path 520 of the object 462 through the field of view 510 of the sensor 464. FIG. 5B shows the robot 460 at a second time when the object 462 passes within the field of view 510 of the sensor 464 along the trajectory path 520, resulting in the creation of a blind spot region as discussed in connection with FIG. 4B. FIG. 5C shows the robot 460 at a third time when the object 462 has completed passing through the field of view 510 of the sensor 464 along the trajectory path 520. At the third time, the field of view 510 of the sensor 464 is no longer obstructed and new sensor data acquired at the third time may be used to alter the set of regions of the occupancy grid included in the uncertainty region, as described in further detail with regard to FIGS. 6A and 6B. For instance, regions of the occupancy grid falling within the blind spot region at the second time may be cleared from the occupancy region at the third time by not being located within the blind spot region at the third time.

Figure 6B:
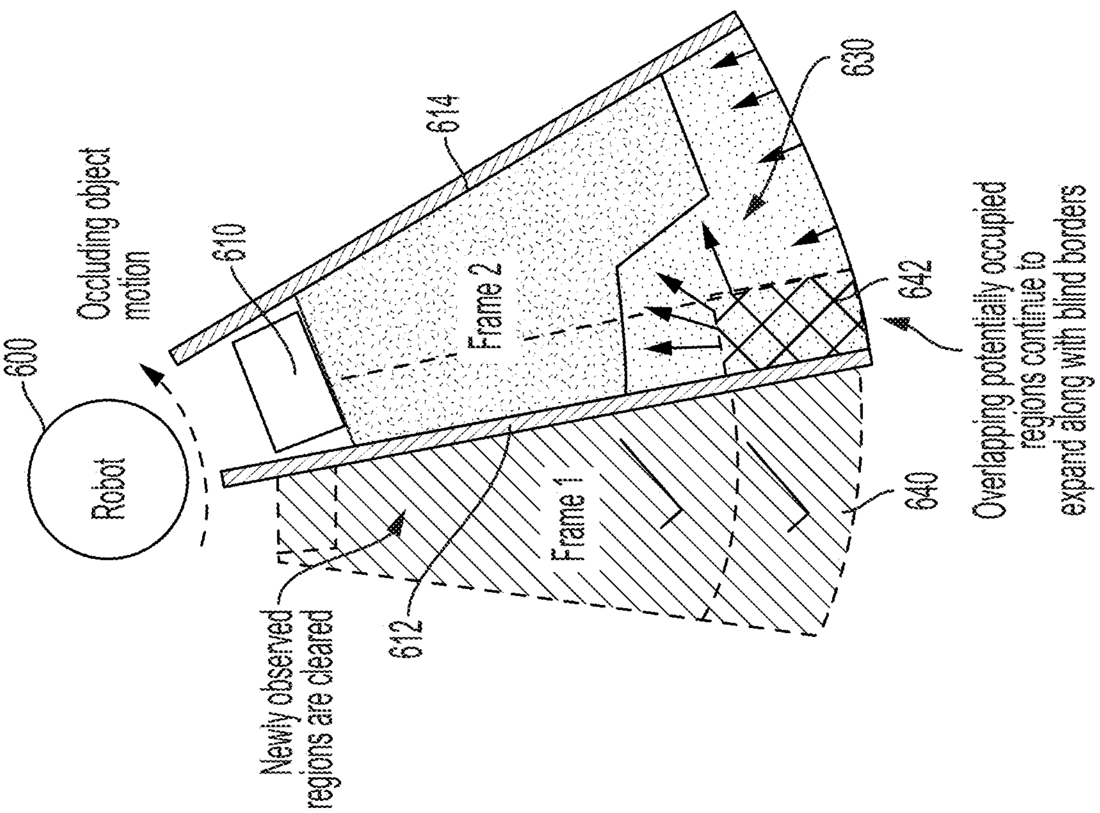
FIG. 6B schematically illustrates an updated uncertainty region determined at a second time relative to the first time shown in FIG. 6A, according to an illustrative embodiment of the invention.
Figure 6A:
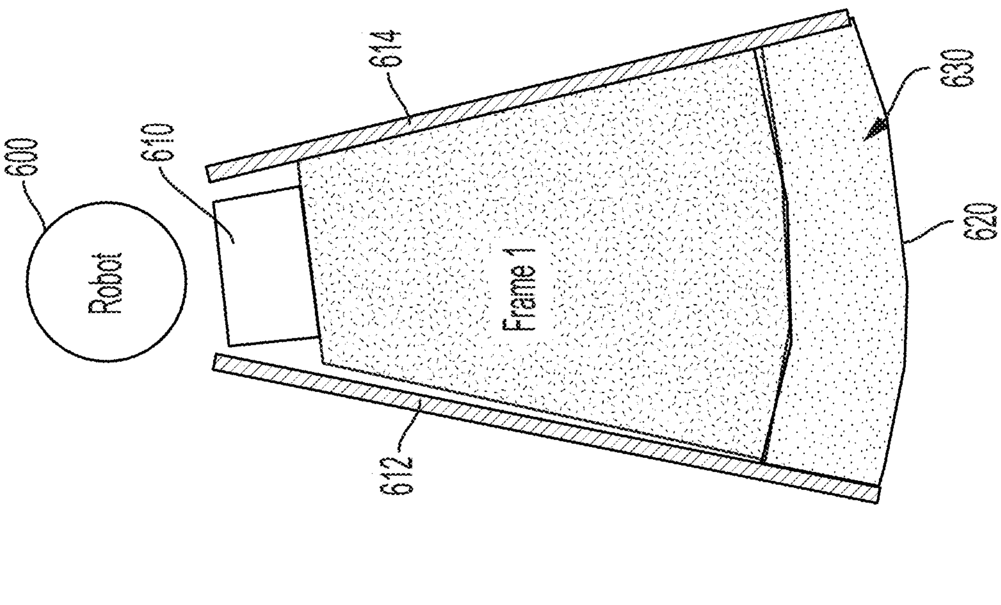
FIG. 6A schematically illustrates an uncertainty region formed within a blind spot region caused by an object manipulated by a robot occluding a portion of a field of view of an onboard sensor at a first time, according to an illustrative embodiment of the invention.

In the example shown in FIGS. 6A-6B, a first time (FIG. 6A) and a second time (FIG. 6B) are illustrated as being consecutive frames of sensor data captured from an onboard sensor system as an occluding object in the field of view of the onboard sensor system is moved through its field of view. It should be appreciated however, that the first and second frames need not be consecutive in time, but may instead by two frames of sensor data separated by any suitable amount of time. FIG. 6A schematically illustrates a scenario in which the occluding object 610 is arranged to obstruct a field of view of an onboard sensor of robot 600 in a first frame, which creates a blind spot region bounded by observed boundaries 612, 614 and blind boundary 620. An uncertainty region 630 from the blind boundary extending within the blind spot region toward the robot 600 represents the portion of the safety field of the robot 600 that may include an entity of concern (e.g., a human) that entered the safety field through the blind boundary 620.

FIG. 6B shows that in the second frame, as the occluding object 610 is moved relative to the onboard sensor system of the robot 600, the shape of the uncertainty region 630 changes relative to the shape of the uncertainty region 630 in the first frame (FIG. 6A). In particular, as the observed boundaries 612, 614 move to a new position in the second frame (FIG. 6B), the regions of the uncertainty region 630 in the first frame that fall outside of the blind spot region in the second frame are cleared from the uncertainty region 630 in the second frame (regions 640 are cleared). Additionally regions that were not included in the uncertainty region 630 in the first frame (because they fell outside of the observed boundaries 612, 614 in the first frame), but that fall within the observed boundaries in the second frame are added to the uncertainty region 630 along the blind boundary 620. As shown in FIG. 6B, a portion (region 642) of the uncertainty region 630 included in the first frame remains present in the second frame. As shown, that portion of the uncertainty region 630 is expanded as shown by the arrows internal to the uncertainty region 630 in all directions that an entity located within that region could have traveled in the time between the first frame and the second frame without crossing the observed boundary 612 (and thus being detected). The amount of additional area of the safety field added to the uncertainty region 630 from the first frame to the second frame may depend, at least in part, on the amount of elapsed time between the first and second frames and a speed (e.g., a top walking speed) of an entity (e.g., a human) in the environment of the robot 600. In this way, newly observed regions are cleared from the uncertainty region 630 and additional regions are added to the uncertainty region 630 as an occluding object 610 is moved within the field of view of the onboard sensors of the robot 600.

Figure 7A:
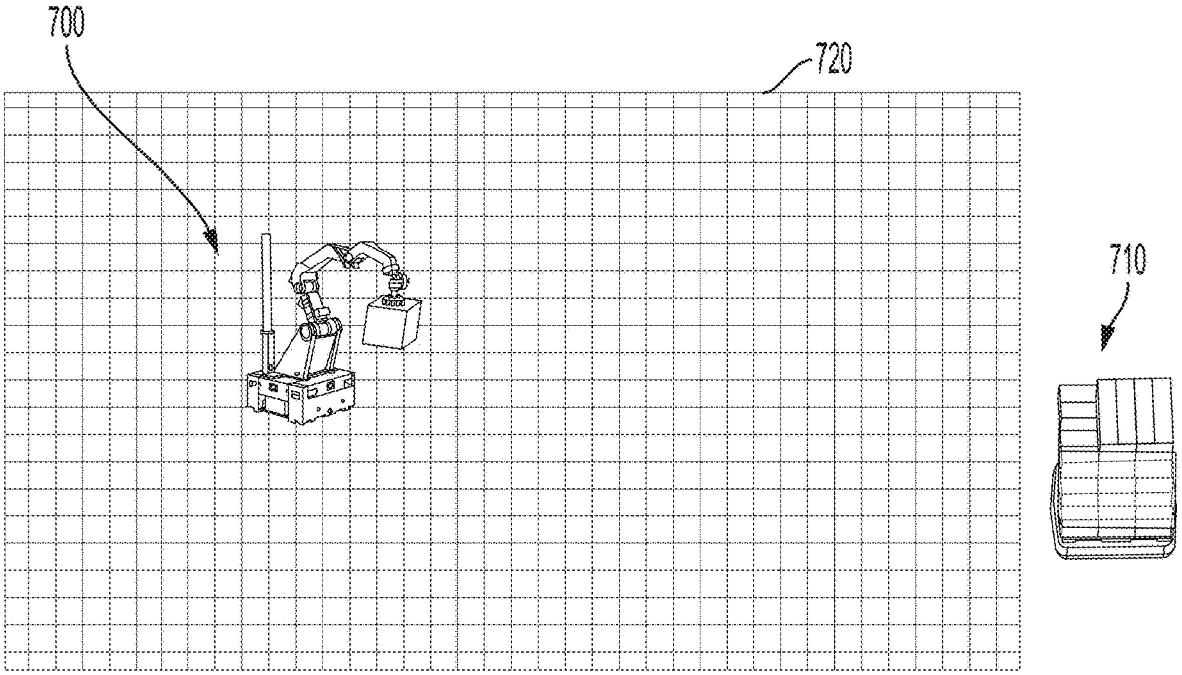
FIGS. 7A-7J schematically illustrate how an uncertainty region within an occupancy grid can change as a whitelisted entity travels within a safety field of a robot, according to an illustrative embodiment of the invention.

FIGS. 7A-7J schematically illustrate modifying the occupancy state of regions in an occupancy grid as a known object (e.g., an unmanned automated guided vehicle (AGV), another robot) travels through a safety field of a mobile robot, in accordance with some embodiments. FIGS. 7A-J7 illustrate one example of how occupancy states of regions in an occupancy grid may change over time based on entities and obstructions within a safety field of a mobile robot. It should be appreciated however, the emphasis in FIGS. 7A-7J is placed on the principles illustrated, and one of ordinary skill in the art could readily envision extending these principles to create many different scenarios in which occupancy states of regions in an occupancy grid evolve over time as changes in the environment of a mobile robot take place.

As shown in FIG. 7A, a robot 700 is associated with a safety field 720 that has been divided into regions that collectively form an occupancy grid, wherein each of the regions in the occupancy grid can be assigned an occupancy state (e.g., "occupied" or "unoccupied") based on the position of objects detected within safety field 720 (e.g., by sensor data from onboard sensors coupled to robot 700 or by other sensor data received from off-robot sensors). Unlike the circular safety field described in connection with the scenarios in FIGS. 4A-4C and FIGS. 6A-6B, the safety field 720 in FIG. 7A-7J is a rectangular safety field that covers a portion of the environment within which the robot 700 operates. For instance, safety field 720 may correspond to an aisle of a warehouse.

As described above, the location of some entities (e.g., automated guided vehicle (AGV), 710) within the environment of a mobile robot may be tracked using the techniques described herein, but the entities themselves may not cause safety concerns for operation of the mobile robot. For instance, warehouses may include multiple robots, AGVs, or other vehicles configured to work individually or collaboratively to facilitate operations within the warehouse. Because such entities do not include human drivers located within the vehicle, it may remain safe for the robot 700 to operate at high speeds (e.g., maximum safe speeds) even when such entities are within the safety field of the robot 700. In such instances, known entities may be added to a "whitelist" of entities that, when detected within safety field 720, do not result in modification of one or more operations of the robot 700, as described herein.

Figure 7B:
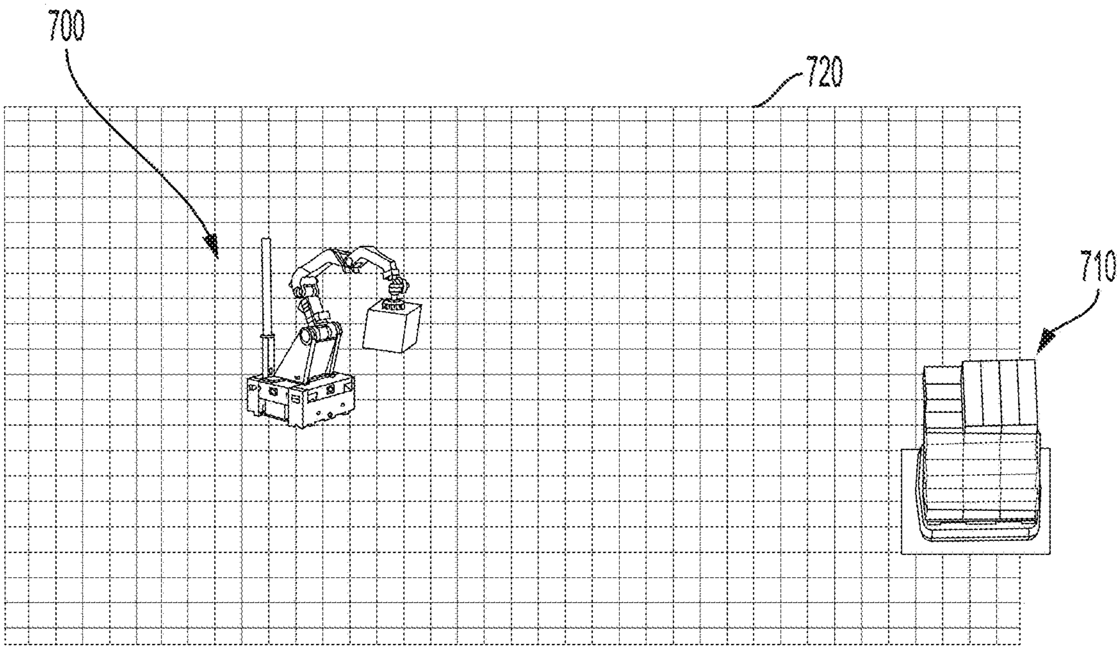

FIG. 7A illustrates a first time at which AGV 710 is located outside of safety field 720. In this scenario, because no entities are detected within the safety field 720 of the robot 700, it can operate without restriction (e.g., at maximum safe speeds). FIG. 7B illustrates a second time at which AGV 710 has entered the safety field 720 of robot 700. Robot 700 may proceed to identify AGV 710 as a whitelisted entity with sufficient confidence (e.g., >99% confidence, 99.5% confidence, 99.9% confidence, 99.99% confidence). AGV 710 may be identified with sufficient confidence using any suitable techniques including, but not limited to, identifying the particular geometry of the AGV or using any other identity detection techniques. In response to identifying AGV 710 as a whitelisted entity, the regions of the occupancy grid corresponding to the known geometry of AGV 710 may be muted (e.g., by assigning them an "unoccupied" or "muted" state) such that the presence of AGV 710 within safety field 720 is not considered in safety calculations for robot 700. Due to there being no detected entities other than AGV 710 within safety field 720 at the second time (FIG. 7B), robot 700 may continue operating without restriction (e.g., at maximum safe speed).

Figure 7C:
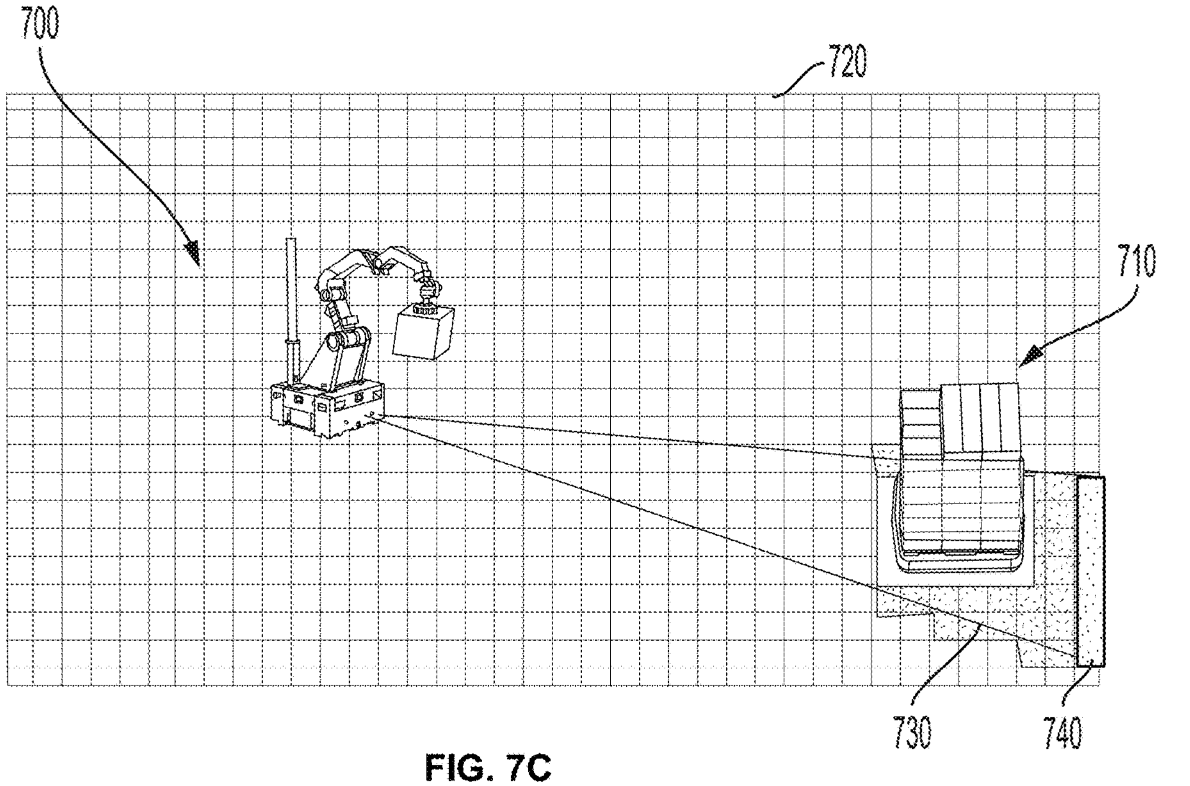

FIG. 7C illustrates a third time at which AGV 710 has moved closer to the robot 700 within safety field 720. As it moves closer, AGV 710 creates a blind spot region 730 in its shadow from the perspective of the onboard sensors of the robot 700. In the example of FIG. 7C, AGV 710 is moving faster than the speed (e.g., a top walking speed) associated with entities of concern (e.g., humans) in the environment of the robot 700, resulting in a region between the AGV 710 and a blind boundary of the safety field 720 within the blind spot region 730. To account for the possibility of entities of concern entering the safety field 720 through the blind boundary, an uncertainty region 740 is created by assigning an occupied state to regions of the occupancy grid along the blind boundary. The size of the uncertainty region 740 may be determined based, at least in part, on a speed (e.g., a top walking speed) of entities of concern (e.g., humans) in the environment of the robot 700. At the third time shown in FIG. 7C, the muting of the regions of the occupancy grid corresponding to the location of the occupancy AGV 710 within the safety field 720 continues for the purpose of safety calculations. However, the distance between the robot 700 and the newly-created uncertainty region 740 may be taken into consideration with regard to modifying operation of the robot 700. If the uncertainty region 740 is sufficiently distant from the robot 700 (e.g., as determined by one or more safety rules), the operation of robot 700 may continue without restriction. If the uncertainty region 740 is within a certain distance of the robot 700 (e.g., as determined by the one or more safety rules), one or more operational parameters of the robot 700 may be modified to ensure safe operation of the robot in view of possible entities of concern within the uncertainty region 740.

Figure 7D:
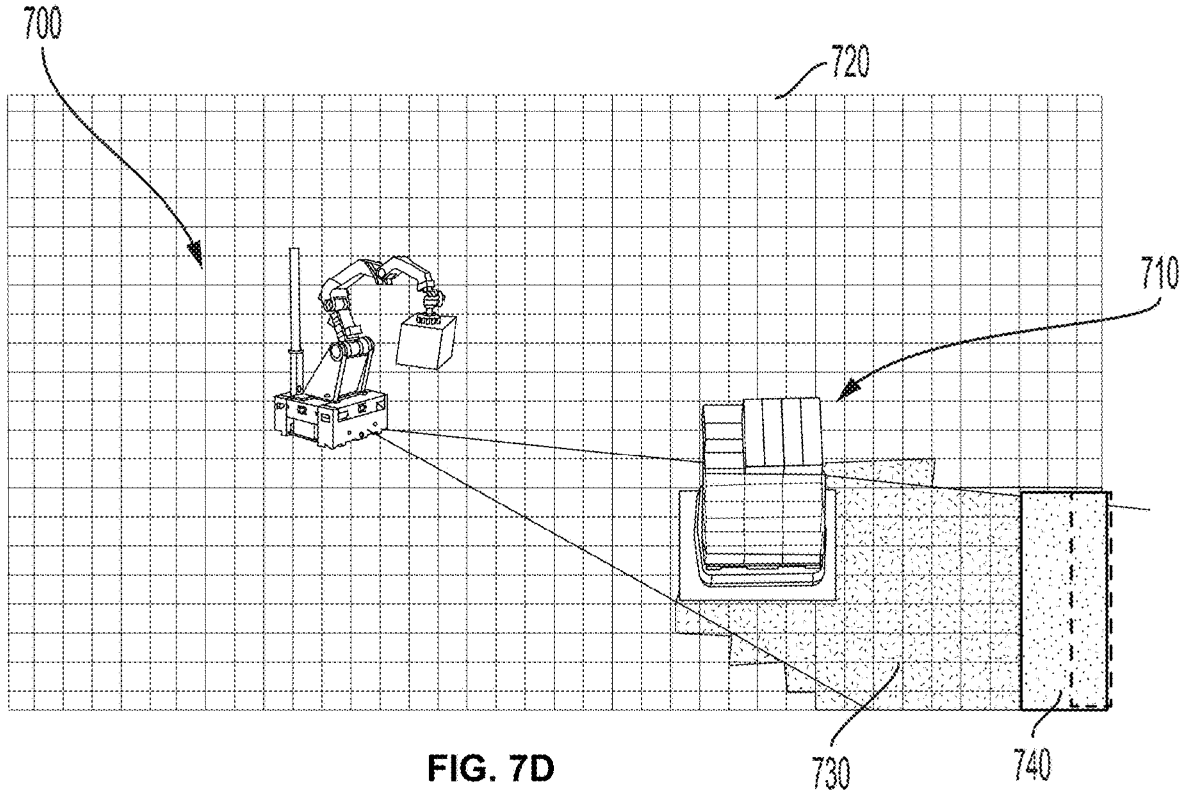

FIG. 7D illustrates a fourth time at which AGV 710 has continued to move closer to the robot 700 within safety field 720. As the AGV 710 continues to move within the safety field 720, both the size of the blind spot region 730 and the size of the uncertainty region 740 within the blind spot region 730 grows. In particular, the uncertainty region 740 at the third time (FIG. 7C) shown as a dotted region in FIG. 7D grows with the speed (e.g., top walking speed) of entities of concern (e.g., humans) in the environment of the robot 700. At the fourth time shown in FIG. 7D, the muting of the regions of the occupancy grid corresponding to the location of the occupancy AGV 710 within the safety field 720 continues for the purpose of safety calculations, which consider the distance from the robot 700 to the updated uncertainty region 740.

Figure 7E:
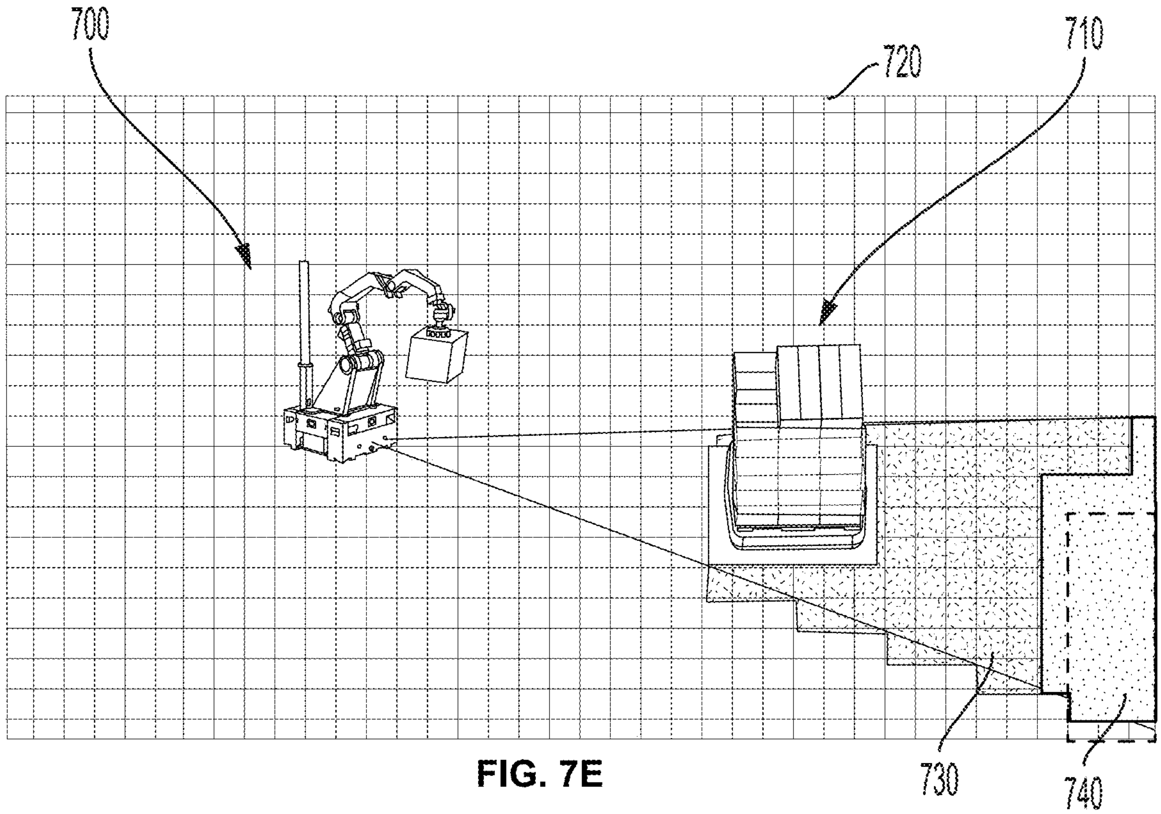

FIG. 7E illustrates a fifth time at which AGV 710 has changed direction and proceeds to move laterally with respect to robot 700 within safety field 720. As the AGV 710 moves laterally with respect to robot 700, the shape of the blind spot region 730 and the shape of the uncertainty region 740 within the blind spot region 730 changes from the fourth time (FIG. 7D). In particular, portions of the previous uncertainty region 740, shown as a dotted region in FIG. 7E, which are observable by the robot 700 at the fifth time because they fall outside of the blind spot region 730 created by the AGV 710, are removed from the uncertainty region 740 at the fifth time (FIG. 7E), and regions at new blind boundaries of the safety field 720 are added to the uncertainty region at the fifth time. Additionally, portions of the uncertainty region at the fourth time (FIG. 7D) that remain within the blind spot region 730 at the fifth time (FIG. 7E) grow within the blind spot region 730 based, at least in part, on the speed (e.g., top walking speed) of entities of concern (e.g., humans) in the environment of the robot 700. At the fifth time shown in FIG. 7E, the muting of the regions of the occupancy grid corresponding to the location of the occupancy AGV 710 within the safety field 720 continues for the purpose of safety calculations, which consider the distance from the robot 700 to the updated uncertainty region 740.

Figure 7F:
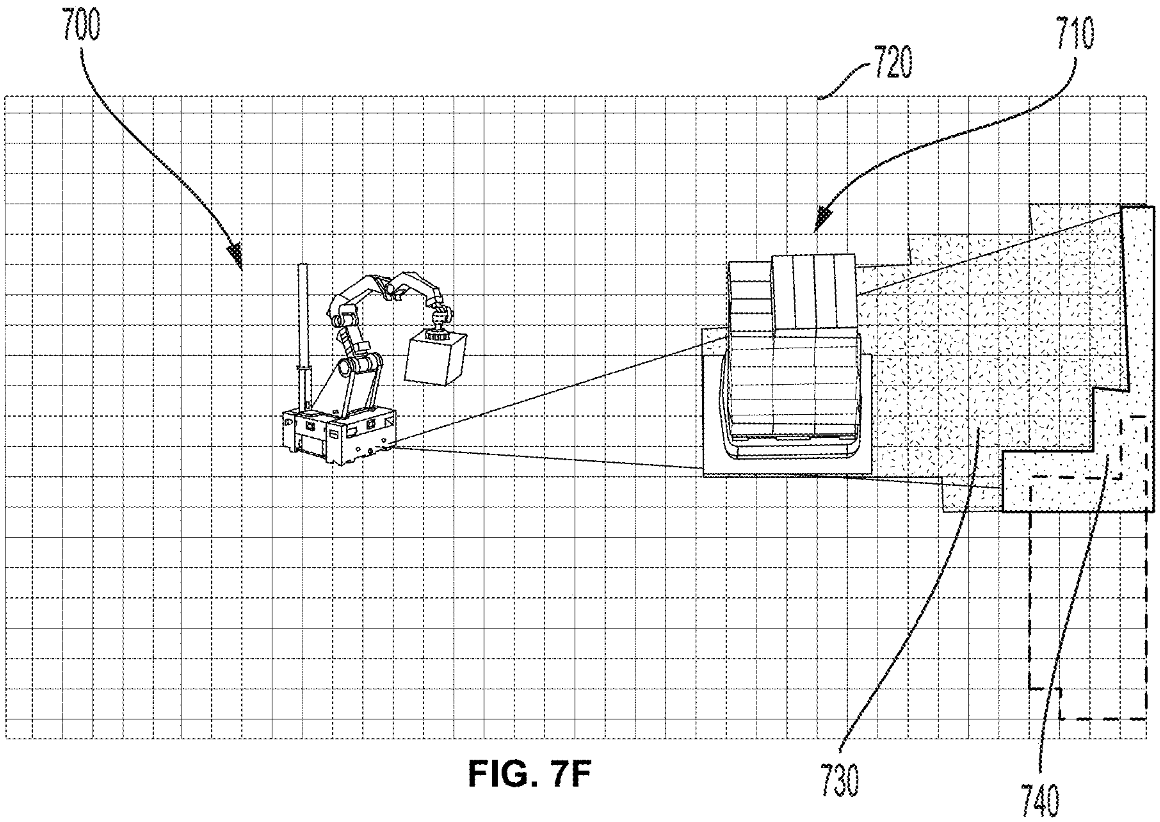

FIG. 7F illustrates a sixth time at which AGV 710 continues to move laterally with respect to robot 700 within safety field 720. As the AGV 710 continues to move laterally with respect to robot 700, additional portions of the previous uncertainty region 740 at the fifth time, shown as a dotted region in FIG. 7F, which are observable by the robot 700 at the sixth time because they fall outside of the blind spot region 730 created by the AGV 710, are removed from the uncertainty region 740 at the sixth time (FIG. 7F), and regions at new blind boundaries of the safety field 720 are added to the uncertainty region at the sixth time. Additionally, portions of the uncertainty region at the fifth time (FIG. 7E) that remain within the blind spot region 730 at the sixth time (FIG. 7F) grow within the blind spot region 730 based, at least in part, on the speed (e.g., top walking speed) of entities of concern (e.g., humans) in the environment of the robot 700. At the sixth time shown in FIG. 7F, the muting of the regions of the occupancy grid corresponding to the location of the occupancy AGV 710 within the safety field 720 continues for the purpose of safety calculations, which consider the distance from the robot 700 to the updated uncertainty region 740.

Figure 7G:
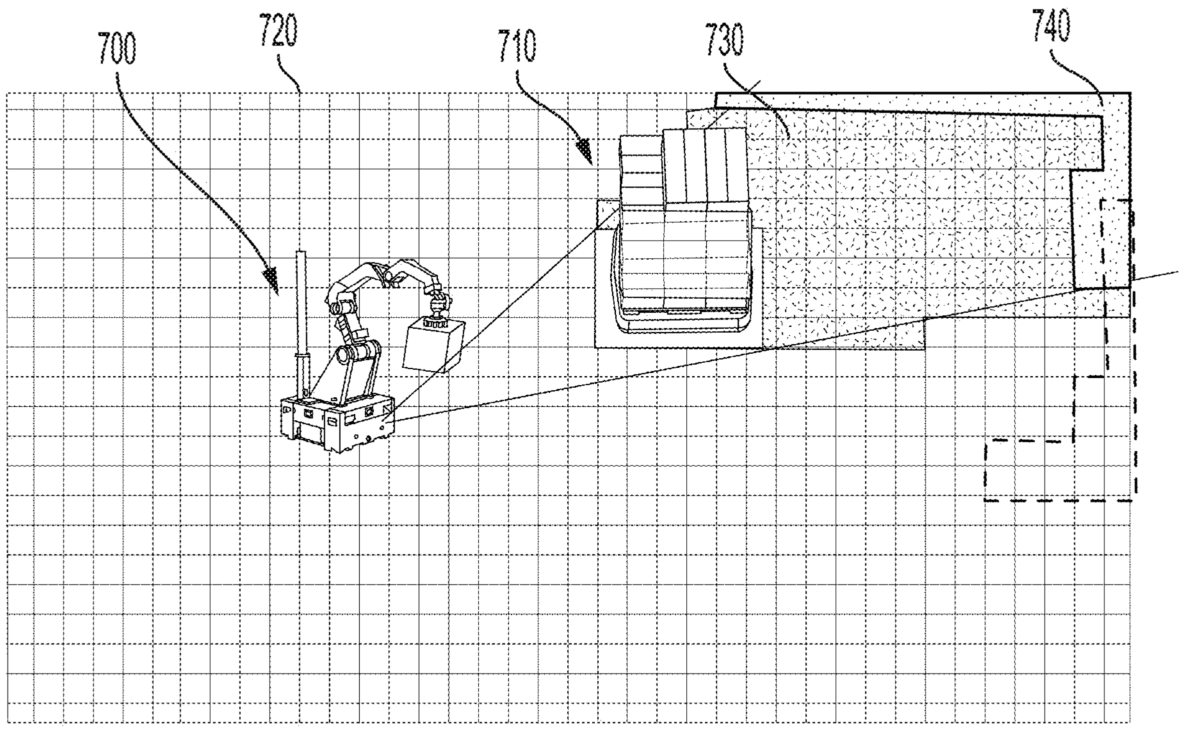

FIG. 7G illustrates a seventh time at which AGV 710 continues to move laterally with respect to robot 700 within safety field 720. As the AGV 710 continues to move laterally with respect to robot 700, additional portions of the previous uncertainty region 740 at the sixth time, shown as a dotted region in FIG. 7G, which are observable by the robot 700 at the seventh time because they fall outside of the blind spot region 730 created by the AGV 710, are removed from the uncertainty region 740 at the seventh time (FIG. 7G), and regions at new blind boundaries at the top and right boundaries of the safety field 720 are added to the uncertainty region at the seventh time. Additionally, portions of the uncertainty region at the sixth time (FIG. 7F) that remain within the blind spot region 730 at the seventh time (FIG. 7G) grow within the blind spot region 730 based, at least in part, on the speed (e.g., top walking speed) of entities of concern (e.g., humans) in the environment of the robot 700. At the seventh time shown in FIG. 7G, the muting of the regions of the occupancy grid corresponding to the location of the occupancy AGV 710 within the safety field 720 continues for the purpose of safety calculations, which consider the distance from the robot 700 to the updated uncertainty region 740.

Figure 7H:
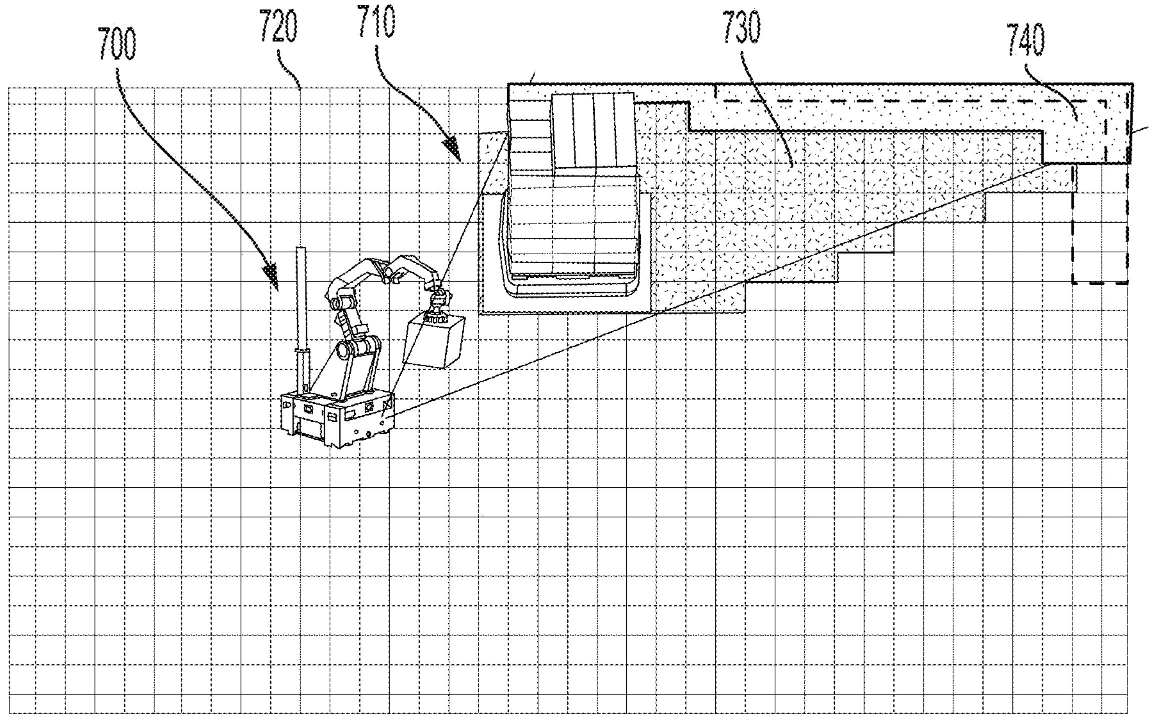

FIG. 7H illustrates an eighth time at which AGV 710 moves towards robot 700 within safety field 720. As the AGV 710 moves towards robot 700, additional portions of the previous uncertainty region 740 at the seventh time, shown as a dotted region in FIG. 7H, which are observable by the robot 700 at the eighth time because they fall outside of the blind spot region 730 created by the AGV 710, are removed from the uncertainty region 740 at the eighth time (FIG. 7H), and regions at a new blind boundary at the top edge of the safety field 720 is added to the uncertainty region at the eighth time. Additionally, portions of the uncertainty region at the seventh time (FIG. 7G) that remain within the blind spot region 730 at the eighth time (FIG. 7H) grow within the blind spot region 730 based, at least in part, on the speed (e.g., top walking speed) of entities of concern (e.g., humans) in the environment of the robot 700. At the eighth time shown in FIG. 7H, the muting of the regions of the occupancy grid corresponding to the location of the occupancy AGV 710 within the safety field 720 continues for the purpose of safety calculations, which consider the distance from the robot 700 to the updated uncertainty region 740. As shown, due to the muting of the regions corresponding to the AGV 710, the AGV 710 can approach the robot 700 very closely without forcing a safety stop of operation of the robot 700, while still maintaining a known safe distance between robot 700 and entities of concern (e.g., humans) within the safety field 720.

Figure 7I:
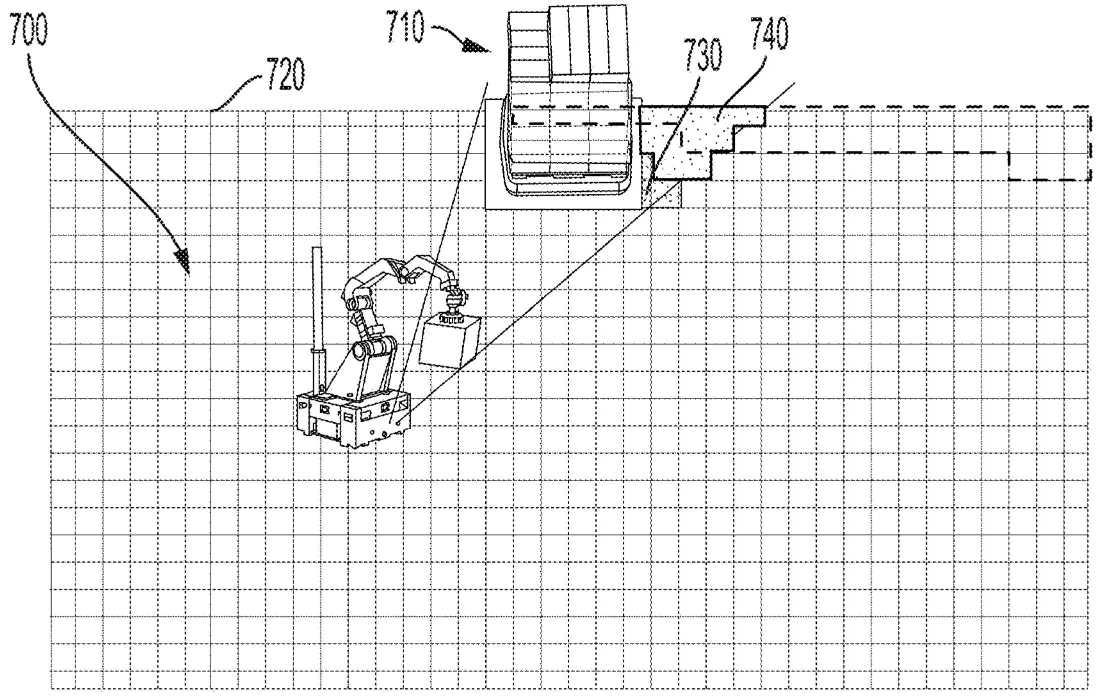

FIG. 7I illustrates a ninth time at which AGV 710 starts moving out of the safety field 720 of robot 700. As the AGV 710 moves out of the safety field 720, additional portions of the previous uncertainty region 740 at the eighth time, shown as a dotted region in FIG. 7I, which are observable by the robot 700 at the ninth time because they fall outside of the blind spot region 730 created by the AGV 710, are removed from the uncertainty region 740 at the ninth time (FIG. 7I), and portions of the uncertainty region at the eighth time (FIG. 7H) that remain within the blind spot region 730 at the ninth time (FIG. 7I) grow within the blind spot region 730 based, at least in part, on the speed (e.g., top walking speed) of entities of concern (e.g., humans) in the environment of the robot 700, resulting in a relatively updated uncertainty region 740. At the ninth time shown in FIG. 7I, the muting of the regions of the occupancy grid corresponding to the location of the occupancy AGV 710 within the safety field 720 continues for the purpose of safety calculations, which consider the distance from the robot 700 to the updated uncertainty region 740.

Figure 7J:
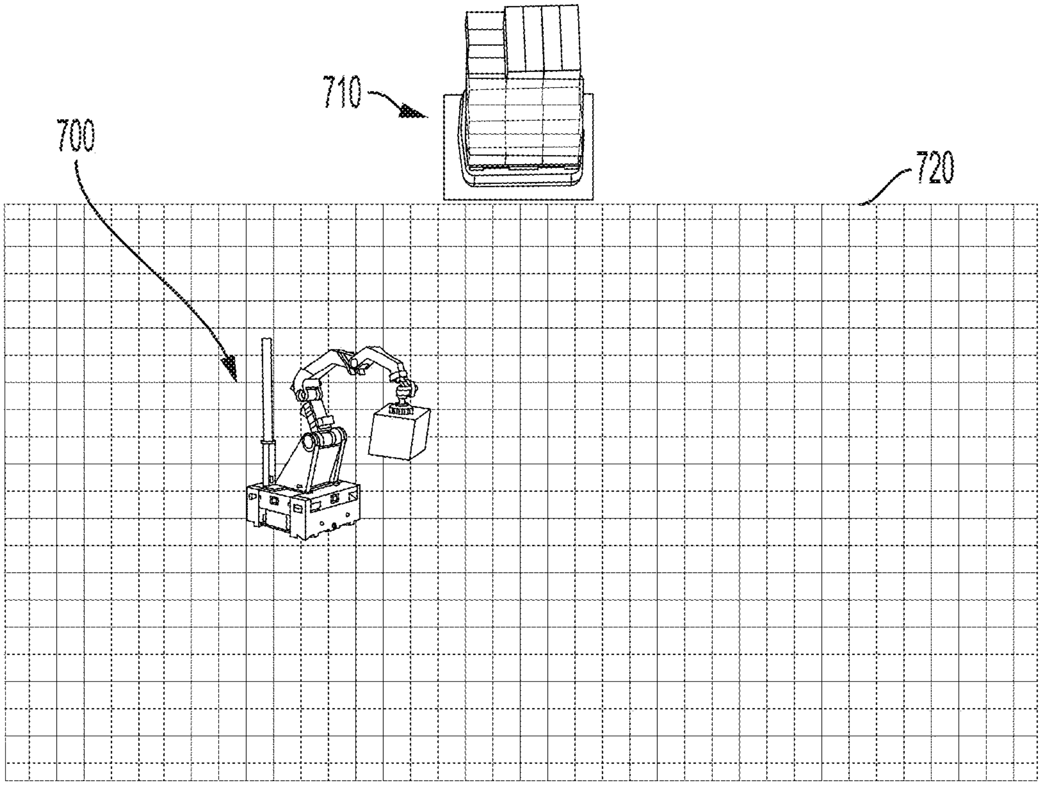

FIG. 7J illustrates a tenth time at which AGV 710 has moved completely out of the safety field 720 of robot 700. Since the AGV 710 has moved completely out of the safety field 720, it no longer creates a blind spot region 730 within the safety field 720 and the entire safety field 720 returns to a clear state in which no entities are detected.

Any suitable shape safety field and corresponding occupancy grid covering the safety field may be used in accordance with embodiments of the present technology. FIGS. 8A-8D illustrate non-limiting examples of occupancy grid configurations that may be used in accordance with some embodiments. FIG. 8A schematically illustrates a circular (polar) 2D fixed grid that may be used as an occupancy grid as described, for example, in connection with the scenarios shown in FIGS. 4A-4C and 6A-6D. FIG. 8B schematically illustrates a rectangular 2D fixed grid that may be used as an occupancy grid as described, for example, in connection with the scenarios shown in FIGS. 7A-7J. FIG. 8C schematically illustrates a rectangular 2D quadtree grid in which the region size across the occupancy grid is non-uniform. FIG. 8D schematically illustrates a rectangular 3D octree grid in which the region size across the occupancy grid is non-uniform in multiple dimensions. Other grid configurations are also contemplated. For instance, a spherical (polar) 3D grid with uniform or non-uniform spacing may be used in some embodiments.

Figure 9:
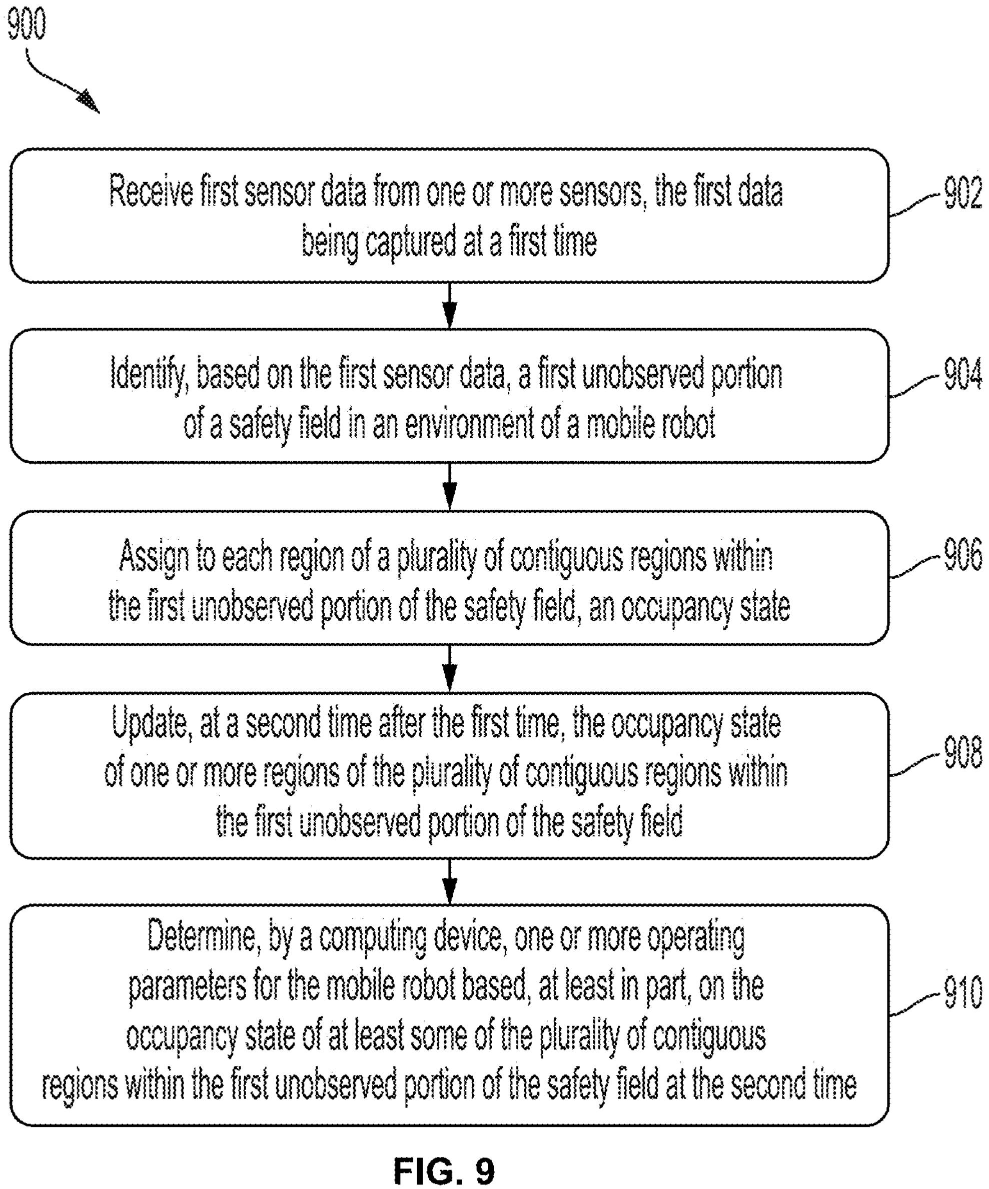
FIG. 9 is a flowchart of a process for using a temporally-updated occupancy grid to facilitate safe operation of a mobile robot, according to an illustrative embodiment of the invention.

FIG. 9 illustrates a process 900 for determining one or more operating parameters for a mobile robot using a temporal occupancy grid within a safety field of the mobile robot, in accordance with some embodiments. In act 902, first sensor data captured by one or more sensors at a first time is received. The first sensor data may include sensor data from one or more sensors (e.g., LIDAR sensors, radar sensors, camera sensors) located onboard the mobile robot, one or more sensors located external to the mobile robot (e.g., one or more sensors located on another robot or a vehicle in the environment of the robot, one or more sensors located at a fixed location in the environment of the robot), or a combination of onboard and external sensors.

Process 900 then proceeds to act 904, where a first unobserved portion of a safety field in an environment of a mobile robot is identified based on the first sensor data. For example, the first unobserved portion of the safety field may include a "blind spot" not observable by the one or more sensors caused by an object located within the safety field. Additionally or alternatively, the first unobserved portion may include a portion of the safety field that is not within the field of view of the one or more sensors at the first time. In some embodiments, the one or more sensors may include multiple sensors arranged at different locations in the environment and the first unobserved portion may be determined based on sensor data obtained from each of the multiple sensors. For instance, a first sensor of the multiple sensors may be arranged in the environment to sense entities within at least a portion of a blind spot for a second sensor of the multiple sensors at the first time.

Process 900 then proceeds to act 906, where each of the plurality of contiguous regions within the first unobserved portion of the safety field (e.g., each of the regions of an occupancy grid that includes the first unobserved portion) is assigned an occupancy state. For instance, as described herein, regions located outside of a blind spot region caused by an object that obstructs a portion of a field of view of the one or more sensors may be assigned an unoccupied state, at least some regions located within a blind spot region may be assigned an occupied state, and other regions located within a blind spot region may be assigned an unoccupied state. In some embodiments, each region of the occupancy grid may be assigned one of two states (e.g., occupied or unoccupied). In other embodiments, more than two states may be used. For instance, some regions that are occupied by a whitelisted entity (e.g., another robot, an AGV), a portion of the robot (e.g., the robot's manipulator arm), or an object that the robot is manipulating, may be associated with a "muted" state, which indicates the region is occupied, but should be ignored for safety calculations. Additionally, in some embodiments, the regions that fall within a blind spot region of the occupancy grid may be assigned a separate state such as "recently unoccupied," which indicates that although the occupied status of the region has not been verified by sensor data, it is unlikely that an entity of concern is located within the region.

Process 900 then proceeds to act 908, where at a second time after the first time, the occupancy state of one or more regions of the plurality of the contiguous regions within the first unobserved portion of the safety field is updated. In some embodiments, the occupancy state may be updated based, at least, in part, on an elapsed time from the first time to the second time. For example, as discussed in connection with the scenario illustrated in FIG. 4C, some regions previously assigned an unoccupied state at a first time may be assigned an occupied state at a second time as an uncertainty region within the safety field of the robot grows over time. In some embodiments, the occupancy state may be updated based on second sensor data received after the first time. The second sensor data may be received from the at least some of the same sensor(s) that provided the first sensor data, or the second sensor data may be received, at least in part, from one or more sensors other than those that provided the first sensor data. For instance, a mobile robot operating in an aisle of a warehouse at the first time may receive the first sensor data only from onboard sensors of the mobile robot. The mobile robot may drive toward the end of the aisle, where one or more sensors fixed in the environment at the end of the aisle have a field of view that overlaps the safety field of the mobile robot at the second time. The occupancy state of the regions in the safety field of the mobile robot may be updated at the second time based, at least in part, on sensor data from the one or more sensors fixed in the environment.

Process 900 then proceeds to act 910, where one or more operating parameters for the mobile robot are determined based at least in part, on the occupancy state of at least some regions of the plurality of contiguous regions within the first unobserved portion of the safety field at the second time. For instance, as described herein, a plurality of contiguous regions in an occupancy grid assigned an occupied state may be considered as an uncertainty region within which entities of concern (e.g., humans) may be located. A distance between the uncertainty region and the mobile robot may be determined, and one or more operating parameters of the mobile robot may be modified based on the distance to facilitate safe operation of the mobile robot within its local environment.

As described herein, regions located within an uncertainty region at a first time may be removed or "cleared" from the uncertainty region at a second time if it can be verified based on additional sensor data at the second time that no entities of concern are located in those regions. Accordingly, in some embodiments, the one or more operating parameters of the robot may be determined in act 910 to facilitate clearing of regions from the uncertainty region. For instance, when it is determined at the second time that the distance between the uncertainty region and the mobile robot is less than a threshold distance, the mobile robot may be instructed to operate differently (e.g., by moving its manipulator arm, by moving the object it is manipulating, by driving in a particular direction, etc.) to attempt to clear the portions of the uncertainty region closest to the mobile robot, thereby expanding the safe operating region of the mobile robot within its safety field. In one example, the mobile robot may be instructed to operate faster to, for example, move an object it is manipulating through a field of view of its onboard sensors quickly, thereby reducing the size of the blind spot region caused by the object within the field of view of the sensors. Such an example of speeding up operation of a robot to facilitate safety can be contrary to the operation of conventional safety systems, which may instruct a robot to slow (or shutdown) its operation whenever a possible safety risk is detected within a particular distance from the robot. In some embodiments, planning algorithms (e.g., for arm trajectory planning) may use constraints about occluded portions of the safety field and/or uncertainty regions within the occluded portions to plan manipulation trajectories which avoid or reduce occluded portions of the safety field from developing, especially for long durations.

Figure 10:
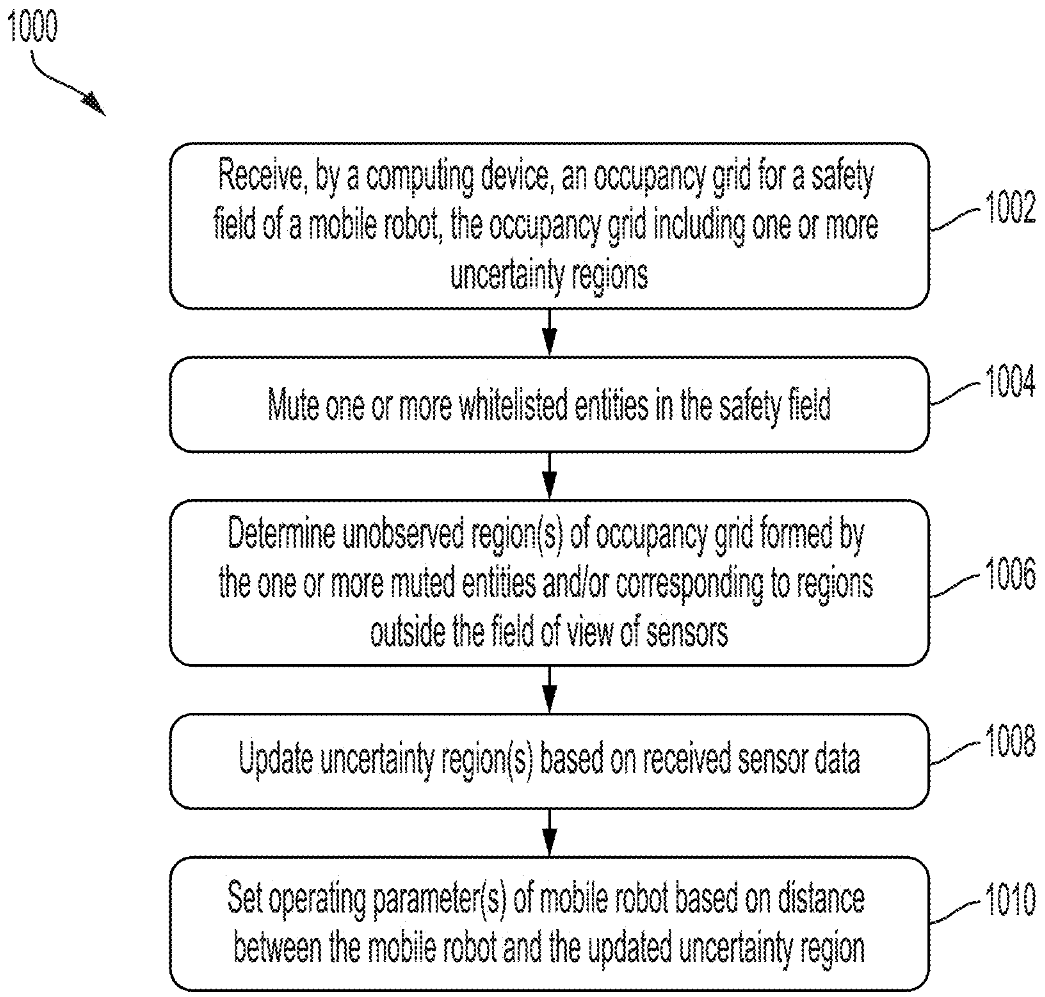
FIG. 10 is a flowchart of a process for updating an uncertainty region of an occupancy grid for a safety field of a robot, according to an illustrative embodiment of the invention.

FIG. 10 illustrates a process for setting one or more operating parameters of a mobile robot using an occupancy grid of a safety region according to some embodiments. In act 1002, an occupancy grid for a safety field of a mobile robot is received. For instance, the occupancy grid may have specified for each region of the occupancy grid, an occupancy state (e.g., occupied or unoccupied). A set of contiguous regions of the occupancy grid having an occupied state (or some other state indicating the presence of a potential entity of concern within the region) may be considered an uncertainty region. Process 1000 then proceeds to act 1004, where one or more whitelisted entities in the safety field are muted. As described herein, whitelisted entities may be objects in the safety field of the mobile robot which are not considered for safety (e.g., distance) calculations within the safety field, but by virtue of being located within the safety field may result in unobserved regions (also referred to herein as "blind spot regions") within the safety field. Whitelisted entities may include, but are not limited to, other robots, unmanned vehicles such as AGVs or drones, portions of the environment such as walls, shelves or overhangs, an object that the robot is manipulating, or a portion of the robot itself (e.g., the manipulator arm and/or end-effector (e.g., gripper) of the robot) that occludes a field of view of one or more sensors. Process 1000 then proceeds to act 1006, where unobserved regions of the occupancy grid are determined. The unobserved regions may include regions formed by the one or more muted entities and/or regions corresponding to regions outside the field of view of sensors (e.g., onboard sensors and/or off-robot sensors). For instance, as described in connection with the example scenario shown in FIG. 7C, an unobserved region described as blind spot region 730 caused by the location of whitelisted AGV 710 in the safety field 720 of robot 700 may be determined by determining which regions of the occupancy grid are located within the observed boundaries at the edges of the AGV 710.

Process 1000 then proceeds to act 1008, where the one or more uncertainty regions (e.g., including regions of the occupancy grid assigned an occupied state) of the occupancy grid are updated based on receive sensor data. The uncertainty region(s) may be updated in several ways. As the robot and/or the whitelisted entity moves in its environment, one or more new blind boundaries at the edge of the safety field of the robot may fall within the unobserved region. In such instances, the uncertainty region is expanded to include regions of the occupancy grid along the new blind boundary or boundaries. Additionally, portions of the uncertainty region that previously fell within an unobserved region, but became observable by, for example, movement of the robot, the whitelisted entity, or the presence of another robot having onboard sensors within the environment of the robot. In such instances, the observable portions may be removed from the uncertainty region, thereby increasing the safe operation portion of the safety field of the robot. Additionally, portions of the uncertainty region that remain within an obstructed region may be expanded toward the robot or other possible directions within the obstructed region to account for the possibility that entities within the uncertainty region are moving.

Process 1000 then proceeds to act 1010 where one or more operating parameters of the mobile robot are set based on a distance between the mobile robot and the updated uncertainty region. Non-limiting examples of updating operating parameter(s) of a mobile robot based on distance from the mobile robot to an uncertainty region are provided herein, for example, in the discussion of act 910 of process 900 shown in FIG. 9.

Figure 11:
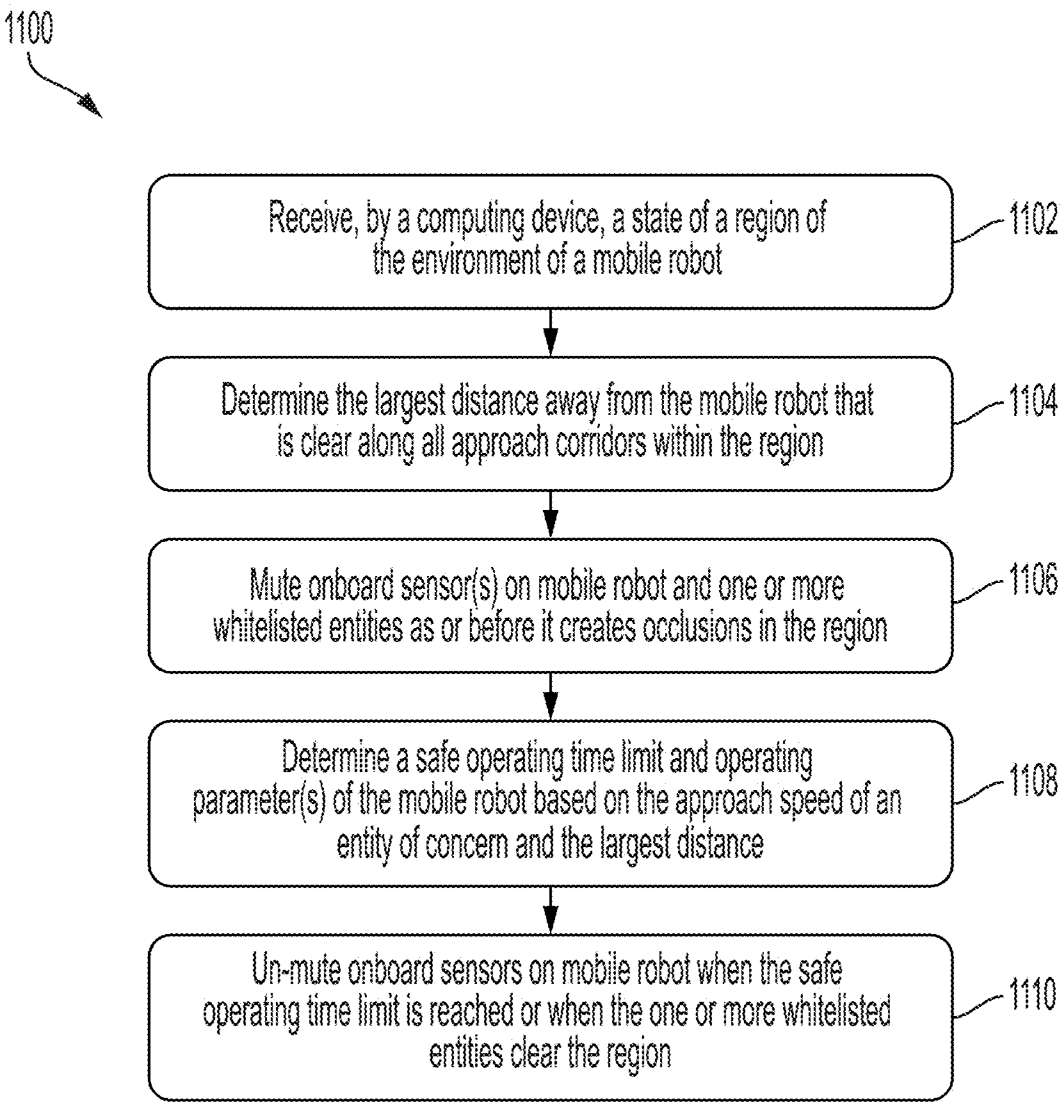
FIG. 11 is a flowchart of a process for safely operating a robot, according to an illustrative embodiment of the invention.

FIG. 11 illustrates a flowchart of a process 1100 for safe operation of a mobile robot within a region of an environment without necessarily requiring use of an occupancy grid, as described in some embodiments of the present technology. In act 1102, a state of a region of the environment of a mobile robot is received by, for example, a computing device associated with the mobile robot. For example, the state of the region may identify entities within an aisle of a warehouse and the location of shelves that define the boundaries of the aisle. Process 1100 then proceeds to act 1104, where the largest distance away from the mobile robot that is clear along all approach corridors to the mobile robot within the region may be determined. Process 1100 then proceeds to act 1106, where onboard sensors of the mobile robot and any whitelisted entities (including their onboard sensors, if applicable) entering the region (but have not yet caused occlusions in the region) may be muted. Process 1100 then proceeds to act 1108, where a safe operating time limit and one or more operating parameters of the robot are determined based, at least in part, on the approach speed of an entity of concern (e.g., a the maximum walking speed of a human) and the largest distance determined in act 1104. Process 1100 then proceeds to act 1110 where the onboard sensors of the mobile robot are unmuted when the safe operating time limit determined in act 1108 is reached or when the one or more whitelisted entities clear the region.

Some embodiments of the technology described herein assign occupancy states to regions within an occupancy grid based on sensor data captured from one or more sensors located on a mobile robot. In some embodiments, sensor data may additionally or alternatively be captured from one or more sensors (e.g., a set of cameras) fixed in a world reference frame of an environment (e.g., a warehouse) to create an occupancy grid for the environment or to create a set of configurable smaller grids in areas of the environment of interest (e.g., different loading bays of a warehouse). Such off-robot sensors may be configured as an "eye in the sky" system configured to track entities of interest (e.g., human workers, robots, vehicles) in the environment and to send information about the tracked entities to mobile robots operating in the environment to ensure safe separation between the mobile robots and other tracked entities. For instance, an off-robot set of cameras may be configured to track people (or other entities) in a large warehouse that does not have full coverage of cameras. When people or other entities are identified by one or more of the cameras, the uncertainty of their location may be reset. When tracking of a particular entity is lost (e.g., because the entity is not currently within the field of view of any of the cameras), uncertainty about their location in the environment grows, and one or more mobile robots operating in the environment may be instructed to operate more conservatively (e.g., by implementing more conservative on-robot safety fields) until the tracked entities who were lost are re-acquired. Such a scenario may occur frequently in a large warehouse with many obstacles such as racking and aisles that cause occlusions within the field of view of fixed off-robot sensors in the warehouse. As described herein, such obstacles may create blind spots within an occupancy grid that covers the warehouse, making it a challenge to obtain a fully populated occupancy grid (e.g., an occupancy grid where blind spots are eliminated). In such instances, fixed sensors arranged at major junctions or travel routes within the environment may be used to identify when there is the potential for an entity of concern (e.g., a human) to be near a particular mobile robot. Additionally, a combination of on-robot and off-robot sensors may be used to more fully populate an occupancy grid using the techniques described herein.

In some embodiments, sensor data from a first mobile robot may be transmitted to a second mobile robot, and the second mobile robot may use the sensor data from the first mobile robot to, at least in part, assign occupancy states to regions of an occupancy grid associated with a safety field of the second mobile robot. To achieve this sensor data fusion, the sensor data from the first mobile robot may be transformed from a coordinate system associated with the first mobile robot (e.g., a first robot reference frame) to the coordinate system of the occupancy grid associated with the safety field of the second mobile robot (e.g., a second robot reference frame). Uncertainty in the assignment process may be introduced based on inaccuracies in the coordinate transformation. In some embodiments, such uncertainty is modeled within the occupancy grid to ensure that spatial variations due to the coordinate transformation do not result in assignment of unoccupied states to regions of the occupancy grid that could possibly include entities of concern.

In other embodiments, each of a first mobile robot and a second mobile robot operating in an environment may be associated with its own occupancy grid, and information from the multiple occupancy grids can be combined to cover larger areas and/or to access perspectives that eliminate or reduce blind spot regions within the environment. For example, first and second mobile robots working back-to-back in an aisle of warehouse may have a respective first occupancy grid and a second occupancy grid. By combining the first and second occupancy grids, the range of the occupancy grid may effectively be doubled while also providing multiple perspectives of the environment at each point in time. As an example, when the first mobile robot occludes a region within its safety field with a self-occlusion object in its end effector, the second mobile robot may be able to sense data within the "shadow" caused by the occluding object as reflected within its occupancy grid, and provide information to fill in the occupancy grid of the first mobile robot. The multi-robot concept using onboard sensors can be extended to blending a combination of on-robot and off-robot sensor data that can, for example, populate and communicate information into local-frame (e.g., robot specific, multiple-robot fused) or global-frame (e.g., for all or a portion of a warehouse) occupancy grids.

In multi-robot scenarios, where sensor data is combined from multiple mobile robots into a single occupancy grid, the robots working near each other may recognize each other with sufficient confidence to enable the robots to be treated as whitelisted entities that should not be considered for safety calculations by muting the location of such entities within the occupancy grid. As described above in connection with the scenario described in FIGS. 7A-7J treating some known entities within an environment as whitelisted entities enables such entities to co-exist in close proximity to each other within the same environment without triggering safety related shutdowns. In some embodiments, whitelist information may to be used to inform the robot about physical boundaries in the occupancy grid. For example, an identifier (e.g., an April tag on a wall) may provide context for that boundary. When occluded, these labeled objects may inform the treatment of the boundaries in the occupancy grid. For example, a wall may be treated as an observed boundary (even when hidden) and a door may be treated as a blind boundary. In this case, rules about that boundary that can be used to inform the uncertainty region within an unobserved region of the occupancy grid, as described herein.

Example Scenarios

Figure 12:
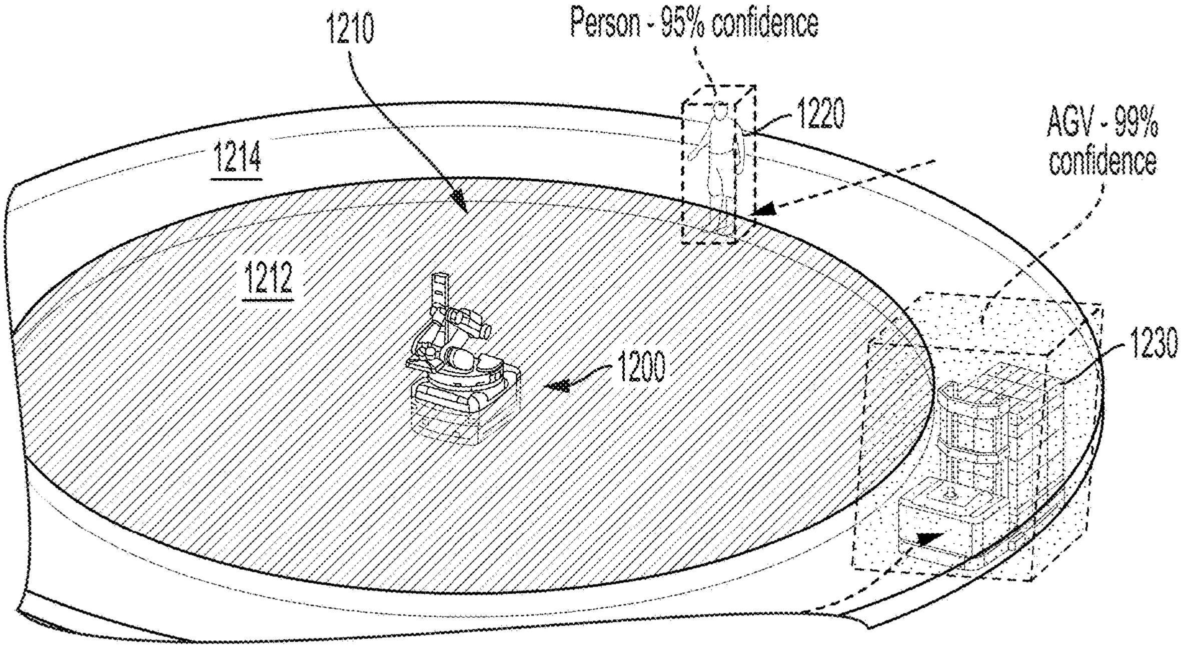
FIG. 12 schematically illustrates a perimeter guarding scenario, according to an illustrative embodiment of the invention.

FIGS. 12-15 illustrate example scenarios for operating a robot safely within an environment in accordance with some embodiments of the present technology. FIG. 12 illustrates a perimeter guarding scenario in which a safety field 1210 surrounding a mobile robot 1200 includes multiple regions arranged at different distances from the mobile robot. In the example shown in FIG. 12, safety field 1210 includes a restricted zone 1212 and a monitored zone 1214 arranged at a farther distance from robot 1200 than the restricted zone 1212. When an entity is detected in restricted zone 1212, a safety system of the robot may cause operation of the mobile robot 1200 to slow or stop. When an entity is detected within the monitored zone 1214, the safety system of the robot may employ different responses based, at least in part, on a classification and/or identification of the entity in the monitored zone 1214. For instance, when a whitelisted entity such as AGV 1230 is detected in the monitored zone 1214, the safety system of the mobile robot 1200 may not change the operation parameter(s) of the robot while continuing the monitor the path of the AGV 1230. By contrast, when a person 1220 is detected in the monitored zone 1214 and the person is moving toward the restricted zone 1212, the safety system of the mobile robot 1200 may cause operation of the robot to slow in anticipation of the person 1220 entering the restricted zone 1212. In some embodiments of the present technology, combining safety-critical proximity detection using one or more of the techniques described herein within the restricted zone 1212 for manipulation of objects with entity identification/classification (e.g., using machine learning techniques) for objects within the monitored zone 1214 enables the mobile robot 1200 to modify its operating parameters (e.g., operating speed) and/or reduce the size of the restricted zone 1212 accordingly. By modifying its operating parameters, stopping events implemented by a safety system of the robot may be prevented from being reached as entities of concern (e.g., person 1220) approach the restricted zone 1212. Classification of entities within monitored zone 1214 may be combined with entity models to track paths and predict future motion of the entities near the perimeter of the restricted zone 1212, and known entities (e.g., AGV 1230) may be whitelisted as appropriate. Such an approach may prevent unnecessary protective stops of the robot 1200 caused by approaches of humans and other entities of concern and prevent the need to always slow the robot conservatively, while the area/volume monitoring may provide a safety back-stop. Although only two zones (i.e., restricted zone 1212 and monitored zone 1214) are shown as part of safety field 1210 in the example of FIG. 12, it should be appreciated that safety field 1210 may alternatively include more than two zones (e.g., multiple monitored zones) arranged at different distances from the robot 1200.

Figure 13:
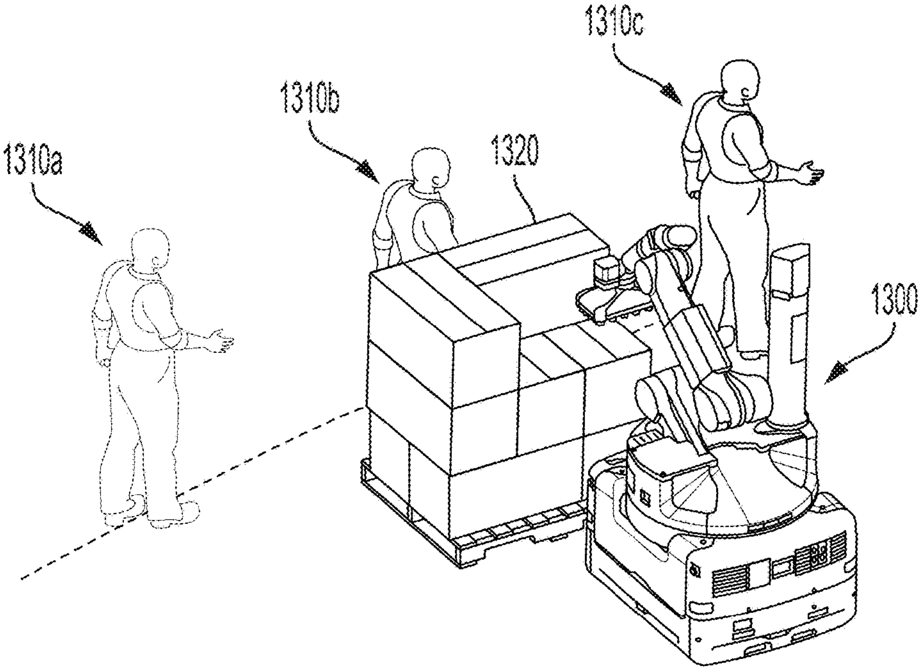
FIG. 13 schematically illustrates an entity tracking scenario, according to an illustrative embodiment of the invention.

FIG. 13 illustrates a scenario in which an entity of concern (e.g., a human) located in proximity to a mobile robot 1300 may become obstructed by objects in the environment also located in proximity to robot 1300. Tracking entities from a time when they are visible, through occluded periods, and when the entities are again observable may facilitate safe operation of a mobile robot in cluttered environments. In the example shown in FIG. 13, robot 1300 is operating in an environment to unload boxes 1320 from a pallet. At a first time 1310*a*, a person is observable by one or more onboard sensors of robot 1300. At a second time 1310*b*, the person walks behind the pallet of boxes 1320 and as such, is not observable by the onboard sensor(s) of the robot 1300 due to the occlusion caused by the pallet of boxes 1320. At a third time 1310*c*, the person has moved past the pallet of boxes 1320 and again is observable by the onboard sensor(s) of the robot 1300. In the example of FIG. 13, at the first time 1310*a* one or more operations of the robot 1300 may be slowed or stopped due to the proximity of the person to the robot 1300. However, even though at the second time 1310*b* the person is not detected, it may be important to prevent restart of the slowed/stopped robot because the person is still in close proximity to the robot 1300, by virtue of being located in the blind spot of the onboard sensor(s) of the robot 1300 at the second time. In some embodiments, after the person is re-observable at the third time 1310, the robot 1300 may be configured to automatically resume operation (or faster operation) after it has been determined that the person is outside of a restricted portion of the safety zone of the robot.

Figure 14:
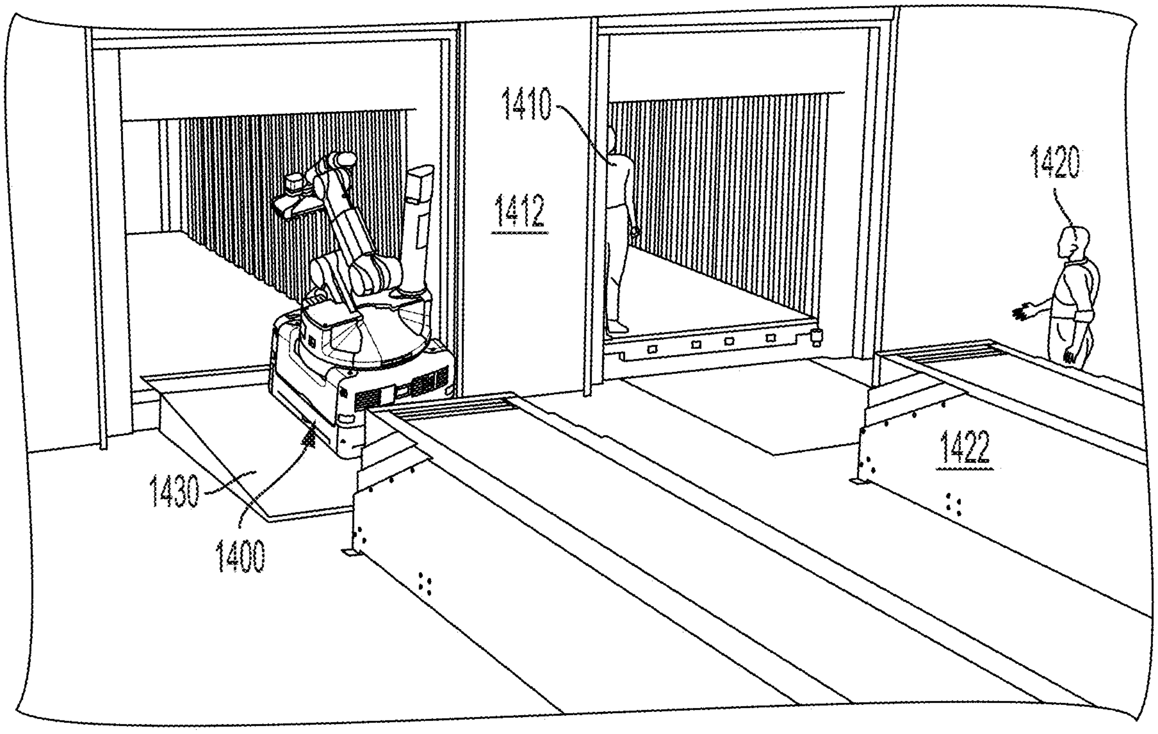
FIG. 14 schematically illustrates a scenario in which a mobile robot is operating within a loading dock of a warehouse, according to an illustrative embodiment of the invention.

FIG. 14 illustrates an example scenario of a robot 1400 operating in a loading dock of a warehouse. As shown in FIG. 14, loading docks are typically complex and dynamic 3D environments without the guarantee of fixed-height or consistent horizontal ground planes. For instance, infrastructure elements can be found in different configurations (e.g., dock plate angles, trailer floor heights, dock doors open/closed, dock seals deformed to varying degree, conveyor extension length, etc.) posing challenges for safe operation of the robot 1400 when 2D fixed-plane safety systems (e.g., 2D LIDAR systems) are used. Infrastructure elements also pose a partial occlusion challenge, particularly near the floor plane where sight-lines on onboard sensors and/or off-robot sensors are blocked by ramps (e.g., ramp 1430), conveyors (e.g., conveyor 1422) or other infrastructure elements (e.g., wall 1412 located between two loading bays). Above and around these infrastructure obstacles, partial observations of humans or other entities of concern in the scene are possible. For example, as shown in FIG. 14, human 1410 is occluded from the onboard sensor(s) of robot 1400 by wall 1412 located between the robot and the human 1410. Additionally, human 1420 is partially occluded from the onboard sensor(s) of robot 1400 by conveyor 1422 located between the robot 1400 and the human 1420. Both human 1410 and human 1420 may occluded for a robot that includes 2D onboard sensors having a field of view only near the ground plane. Some embodiments of the technology described herein are configured to employ 3D sensing to detect partially occluded entities in the environment of the robot, such as those shown in FIG. 14, which may facilitate safe operation of the robot with complex and/or cluttered environments such as a loading dock.

Figure 15:
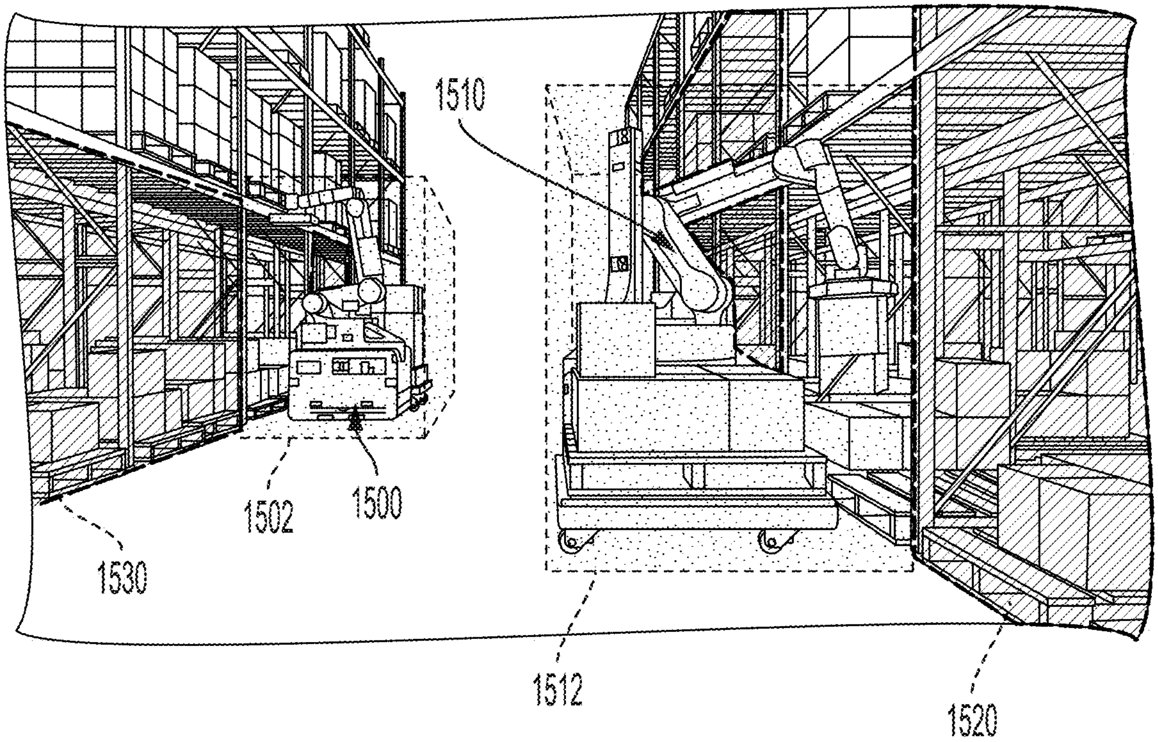
FIG. 15 schematically illustrates a scenario in which multiple mobile robots are operating within an aisle of a warehouse, according to an illustrative embodiment of the invention.

FIG. 15 illustrates an example scenario of multiple robots working within an environment such as an aisle of a warehouse. As robots move to different work areas in a warehouse, a current workspace of the robots may be verified as clear of entities of concern before and while manipulating objects within the current workspace. Recognizing landmarks reliably and using the recognitions to selectively mute areas and/or volumes within the workspace of a robot in accordance with one or more of the techniques described herein may allow the robot to operate close to racking, pallets, and the objects being manipulated, while monitoring the open spaces in the workspace around the robot for approach by humans and other entities of concern. As shown in FIG. 15, robot 1500 is operating to load boxes from a first shelf onto a first pallet and robot 1510 is operating to unload boxes from a second pallet onto a second shelf located on an opposite side of the aisle from the first shelf. Each of robots 1500 and 1510 has defined around it, a corresponding volume 1502, 1512 that includes the pallet of boxes it is configured to manipulate. The racking 1520, 1530 has also been identified and muted within the safety field of the robots 1500, 1510 to ensure that the robots can continue to operate while monitoring for humans entering the safety field (e.g., the aisle).

Safe localization and 3D muting functions in a scenario such as that shown in FIG. 15 are not typically available using conventional safety systems for mobile robots. Similar functionality may allow mobile robots operating in a warehouse to ignore moving objects (e.g., boxes) on conveyors while staying vigilant for approach by persons in a corridor between the conveyor and a container (e.g., a truck) wall, which may be considered an approach corridor in which non-human objects are unlikely to be moving. In another example, identifying a fork-truck might then allow the selective presence monitoring of the volume within the driver-seat of the fork truck, with the assumption that any object inside that pre-defined volume is likely a person. Identifying such volumes as high-likelihood human approach areas may enable the use of 3D volumetric sensing to be applied aggressively in dynamic scenes. Landmarked features (e.g., with machine readable tags and/or by semantic identification) could be used to identify protected volumes in a scene, as shown in FIG. 15.

Figure 16:
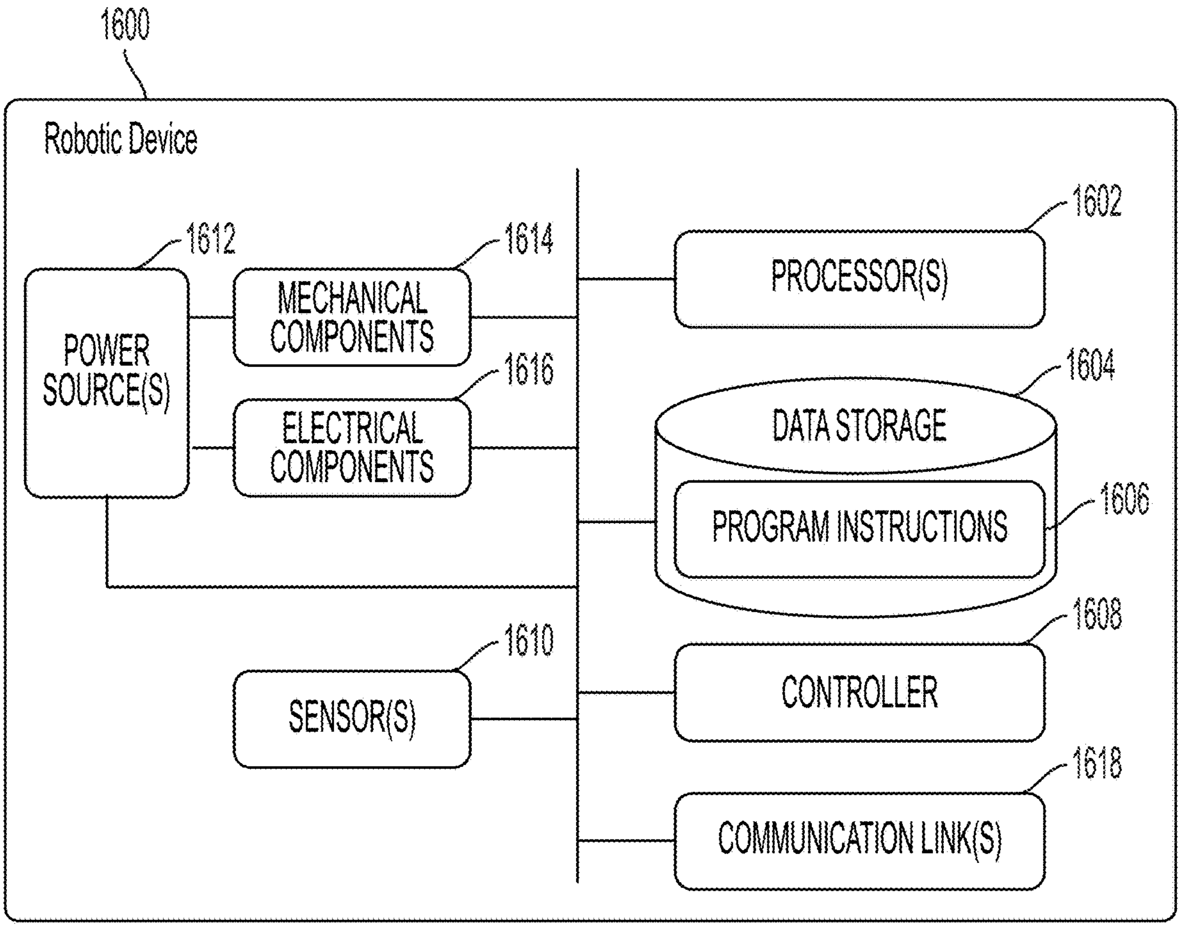
FIG. 16 illustrates an example configuration of a robotic device, according to an illustrative embodiment of the invention.

FIG. 16 illustrates an example configuration of a robotic device 1600, according to an illustrative embodiment of the invention. An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device).

In some implementations, the robotic device may include force sensors that measure or estimate the external forces (e.g., the force applied by a limb of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

FIG. 16 illustrates an example configuration of a robotic device (or "robot") 1600, according to an illustrative embodiment of the invention. The robotic device 1600 represents an example robotic device configured to perform the operations described herein. Additionally, the robotic device 1600 may be configured to operate autonomously, semi-autonomously, and/or using directions provided by user(s), and may exist in various forms, such as a humanoid robot, biped, quadruped, or other mobile robot, among other examples. Furthermore, the robotic device 1600 may also be referred to as a robotic system, mobile robot, or robot, among other designations.

As shown in FIG. 16, the robotic device 1600 includes processor(s) 1602, data storage 1604, program instructions 1606, controller 1608, sensor(s) 1610, power source(s) 1612, mechanical components 1614, and electrical components 1616. The robotic device 1600 is shown for illustration purposes and may include more or fewer components without departing from the scope of the disclosure herein. The various components of robotic device 1600 may be connected in any manner, including via electronic communication means, e.g., wired or wireless connections. Further, in some examples, components of the robotic device 1600 may be positioned on multiple distinct physical entities rather on a single physical entity. Other example illustrations of robotic device 1600 may exist as well.

Processor(s) 1602 may operate as one or more general-purpose processor or special purpose processors (e.g., digital signal processors, application specific integrated circuits, etc.). The processor(s) 1602 can be configured to execute computer-readable program instructions 1606 that are stored in the data storage 1604 and are executable to provide the operations of the robotic device 1600 described herein. For instance, the program instructions 1606 may be executable to provide operations of controller 1608, where the controller 1608 may be configured to cause activation and/or deactivation of the mechanical components 1614 and the electrical components 1616. The processor(s) 1602 may operate and enable the robotic device 1600 to perform various functions, including the functions described herein.

The data storage 1604 may exist as various types of storage media, such as a memory. For example, the data storage 1604 may include or take the form of one or more computer-readable storage media that can be read or accessed by processor(s) 1602. The one or more computer-readable storage media can include volatile and/or non-volatile storage components, such as optical, magnetic, organic or other memory or disc storage, which can be integrated in whole or in part with processor(s) 1602. In some implementations, the data storage 1604 can be implemented using a single physical device (e.g., one optical, magnetic, organic or other memory or disc storage unit), while in other implementations, the data storage 1604 can be implemented using two or more physical devices, which may communicate electronically (e.g., via wired or wireless communication). Further, in addition to the computer-readable program instructions 1606, the data storage 1604 may include additional data such as diagnostic data, among other possibilities.

The robotic device 1600 may include at least one controller 1608, which may interface with the robotic device 1600. The controller 1608 may serve as a link between portions of the robotic device 1600, such as a link between mechanical components 1614 and/or electrical components 1616. In some instances, the controller 1608 may serve as an interface between the robotic device 1600 and another computing device. Furthermore, the controller 1608 may serve as an interface between the robotic system 1600 and a user(s). The controller 1608 may include various components for communicating with the robotic device 1600, including one or more joysticks or buttons, among other features. The controller 1608 may perform other operations for the robotic device 1600 as well. Other examples of controllers may exist as well.

Additionally, the robotic device 1600 includes one or more sensor(s) 1610 such as force sensors, proximity sensors, motion sensors, load sensors, position sensors, touch sensors, depth sensors, ultrasonic range sensors, and/or infrared sensors, among other possibilities. The sensor(s) 1610 may provide sensor data to the processor(s) 1602 to allow for appropriate interaction of the robotic system 1600 with the environment as well as monitoring of operation of the systems of the robotic device 1600. The sensor data may be used in evaluation of various factors for activation and deactivation of mechanical components 1614 and electrical components 1616 by controller 1608 and/or a computing system of the robotic device 1600.

The sensor(s) 1610 may provide information indicative of the environment of the robotic device for the controller 1608 and/or computing system to use to determine operations for the robotic device 1600. For example, the sensor(s) 1610 may capture data corresponding to the terrain of the environment or location of nearby objects, which may assist with environment recognition and navigation, etc. In an example configuration, the robotic device 1600 may include a sensor system that may include a camera, RADAR, LIDAR, time-of-flight camera, global positioning system (GPS) transceiver, and/or other sensors for capturing information of the environment of the robotic device 1600. The sensor(s) 1610 may monitor the environment in real-time and detect obstacles, elements of the terrain, weather conditions, temperature, and/or other parameters of the environment for the robotic device 1600.

Further, the robotic device 1600 may include other sensor (s) 1610 configured to receive information indicative of the state of the robotic device 1600, including sensor(s) 1610 that may monitor the state of the various components of the robotic device 1600. The sensor(s) 1610 may measure activity of systems of the robotic device 1600 and receive information based on the operation of the various features of the robotic device 1600, such the operation of extendable legs, arms, or other mechanical and/or electrical features of the robotic device 1600. The sensor data provided by the sensors may enable the computing system of the robotic device 1600 to determine errors in operation as well as monitor overall functioning of components of the robotic device 1600.

For example, the computing system may use sensor data to determine the stability of the robotic device 1600 during operations as well as measurements related to power levels, communication activities, components that require repair, among other information. As an example configuration, the robotic device 1600 may include gyroscope(s), accelerometer(s), and/or other possible sensors to provide sensor data relating to the state of operation of the robotic device. Further, sensor(s) 1610 may also monitor the current state of a function that the robotic system 1600 may currently be operating. Additionally, the sensor(s) 1610 may measure a distance between a given robotic limb of a robotic device and a center of mass of the robotic device. Other example uses for the sensor(s) 1610 may exist as well.

Additionally, the robotic device 1600 may also include one or more power source(s) 1612 configured to supply power to various components of the robotic device 1600. Among possible power systems, the robotic device 1600 may include a hydraulic system, electrical system, batteries, and/or other types of power systems. As an example illustration, the robotic device 1600 may include one or more batteries configured to provide power to components via a wired and/or wireless connection. Within examples, components of the mechanical components 1614 and electrical components 1616 may each connect to a different power source or may be powered by the same power source. Components of the robotic system 1600 may connect to multiple power sources as well.

Within example configurations, any type of power source may be used to power the robotic device 1600, such as a gasoline and/or electric engine. Further, the power source(s) 1612 may charge using various types of charging, such as wired connections to an outside power source, wireless charging, combustion, or other examples. Other configurations may also be possible. Additionally, the robotic device 1600 may include a hydraulic system configured to provide power to the mechanical components 1614 using fluid power. Components of the robotic device 1600 may operate based on hydraulic fluid being transmitted throughout the hydraulic system to various hydraulic motors and hydraulic cylinders, for example. The hydraulic system of the robotic device 1600 may transfer a large amount of power through small tubes, flexible hoses, or other links between components of the robotic device 1600. Other power sources may be included within the robotic device 1600.

Mechanical components 1614 can represent hardware of the robotic system 1600 that may enable the robotic device 1600 to operate and perform physical functions. As a few examples, the robotic device 1600 may include actuator(s), extendable leg(s), arm(s), wheel(s), one or multiple structured bodies for housing the computing system or other components, and/or other mechanical components. The mechanical components 1614 may depend on the design of the robotic device 1600 and may also be based on the functions and/or tasks the robotic device 1600 may be configured to perform. As such, depending on the operation and functions of the robotic device 1600, different mechanical components 1614 may be available for the robotic device 1600 to utilize. In some examples, the robotic device 1600 may be configured to add and/or remove mechanical components 1614, which may involve assistance from a user and/or other robotic device.

The electrical components 1616 may include various components capable of processing, transferring, providing electrical charge or electric signals, for example. Among possible examples, the electrical components 1616 may include electrical wires, circuitry, and/or wireless communication transmitters and receivers to enable operations of the robotic device 1600. The electrical components 1616 may interwork with the mechanical components 1614 to enable the robotic device 1600 to perform various operations. The electrical components 1616 may be configured to provide power from the power source(s) 1612 to the various mechanical components 1614, for example. Further, the robotic device 1600 may include electric motors. Other examples of electrical components 1616 may exist as well.

In some implementations, the robotic device 1600 may also include communication link(s) 1618 configured to send and/or receive information. The communication link(s) 1618 may transmit data indicating the state of the various components of the robotic device 1600. For example, information read in by sensor(s) 1610 may be transmitted via the communication link(s) 1618 to a separate device. Other diagnostic information indicating the integrity or health of the power source(s) 1612, mechanical components 1614, electrical components 1618, processor(s) 1602, data storage 1604, and/or controller 1608 may be transmitted via the communication link(s) 1618 to an external communication device.

In some implementations, the robotic device 1600 may receive information at the communication link(s) 1618 that is processed by the processor(s) 1602. The received information may indicate data that is accessible by the processor(s) 1602 during execution of the program instructions 1606, for example. Further, the received information may change aspects of the controller 1608 that may affect the behavior of the mechanical components 1614 or the electrical components 1616. In some cases, the received information indicates a query requesting a particular piece of information (e.g., the operational state of one or more of the components of the robotic device 1600), and the processor(s) 1602 may subsequently transmit that particular piece of information back out the communication link(s) 1618.

In some cases, the communication link(s) 1618 include a wired connection. The robotic device 1600 may include one or more ports to interface the communication link(s) 1618 to an external device. The communication link(s) 1618 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

A number of implementations have been described. Nevertheless, it will be understood that various modifications may be made without departing from the spirit and scope of the disclosure.

The invention claimed is:

1. A method, comprising:

receiving first sensor data from one or more sensors, the first sensor data being captured at a first time;

identifying, based on the first sensor data, a first unobserved portion of a safety field in an environment of a mobile robot, wherein the first unobserved portion of the safety field corresponds to a portion of the safety field that the one or more sensors cannot observe at the first time due to a first occlusion;

assigning, to each region of a plurality of contiguous regions within the first unobserved portion of the safety field, an occupancy state;

updating, at a second time after the first time, the occupancy state of one or more regions of the plurality of contiguous regions within the first unobserved portion of the safety field;

determining, by a computing device, one or more operating parameters for the mobile robot, the one or more operating parameters based, at least in part, on the occupancy state of at least some regions of the plurality of contiguous regions within the first unobserved portion of the safety field at the second time; and controlling the mobile robot to operate according to the one or more operating parameters.

2. The method of claim 1, wherein the safety field defines a plane surrounding the mobile robot, and the plurality of contiguous regions within the first unobserved portion of the safety field are two-dimensional (2D) regions arranged within the plane.

3. The method of claim 1, wherein the safety field defines a volume surrounding the mobile robot, and the plurality of contiguous regions within the first unobserved portion of the safety field are three-dimensional (3D) regions arranged within the volume.

4. The method of claim 1, wherein the plurality of contiguous regions within the first unobserved portion include a first region and a second region, the second region being closer to the mobile robot than the first region within the first unobserved portion of the safety field, and assigning an occupancy state to each of the plurality of contiguous regions within the first unobserved portion of the safety field comprises:

assigning an occupied state to the first region; and assigning an unoccupied state to the second region.

5. The method of claim 1, further comprising:

identifying, based on the first sensor data, an entity in the safety field;

determining based on information about the entity, whether the entity is a whitelisted entity; and ignoring, when it is determined that the entity is a whitelisted entity, a presence of the entity within the safety field when determining the one or more operating parameters for the mobile robot.

6. The method of claim 5, wherein the information about the entity includes information identifying the entity with a particular confidence level, and the entity is determined as a whitelisted entity only when the particular confidence level is above a threshold confidence level.

7. The method of claim 1, wherein updating, at the second time, the occupancy state of one or more regions of the plurality of contiguous regions within the first unobserved portion of the safety field comprises:

assigning an occupied state to a first region of the plurality of contiguous regions, the first region having an unoccupied state at the first time, wherein the first region is located adjacent to a second region having an occupied state at the first time.

8. The method of claim 7, wherein updating, at the second time, the occupancy state of one or more regions of the plurality of contiguous regions within the first unobserved portion of the safety field further comprises:

determining based on an entity speed for an entity associated with the second region at the first time, whether it is possible for the entity associated with the second region at the first time to have travelled into the first region at the second time; and assigning an occupied state to the first region only when it is determined that it is possible for the entity associated with the second region at the first time to have travelled into the first region at the second time.

9. The method of claim 7, wherein updating, at the second time, the occupancy state of one or more regions of the plurality of contiguous regions within the first unobserved portion of the safety field comprises:

assigning an occupied state to a third region of the plurality of contiguous regions, the third region having an unoccupied state at the first time, wherein the third region is located adjacent to the first region and is not located adjacent to the second region.

10. The method of claim 1, further comprising:

receiving at or before the second time, second sensor data from the one or more sensors; and identifying, based on the second sensor data, a second unobserved portion of the safety field at the second time, wherein the second unobserved portion of the safety field corresponds to a portion of the safety field that the one or more sensors cannot observe at the second time due to a second occlusion, wherein updating, at the second time, the occupancy state of one or more regions of the plurality of contiguous regions within the first unobserved portion of the safety field is based on an overlap between the first unobserved portion and the second unobserved portion.

11. The method of claim 10, wherein updating, at the second time, the occupancy state of one or more regions of the plurality of contiguous regions within the first unobserved portion of the safety field based on an overlap between the first unobserved portion and the second unobserved portion comprises:

assigning an unoccupied state to a first region of the plurality of contiguous regions within the first unobserved portion of the safety field having an occupied state at the first time when the first region is not within the second unobserved portion of the safety field.

12. The method of claim 11, wherein the plurality of contiguous regions within the first unobserved portion of the safety field include a first region and a second region, the first region having an occupied state at the first time and the second region having an unoccupied state at the first time, the second region being adjacent to the first region in the first unobserved portion of the safety field; and updating, at the second time, the occupancy state of one or more regions of the plurality of contiguous regions within the first unobserved portion of the safety field based on an overlap between the first unobserved portion and the second unobserved portion comprises:

assigning an occupied state to the second region when the second region is included within the second unobserved portion of the safety field.

13. The method of claim 11, wherein determining one or more operating parameters for the mobile robot comprises instructing the mobile robot to move at least a portion of the mobile robot to enable the one or more sensors to sense a presence or an absence of entities in the first region at the second time.

14. The method of claim 1, wherein determining one or more operating parameters for the mobile robot comprises one or more of:

determining a trajectory plan for an arm of the mobile robot, instructing the mobile robot to alter a speed of motion of at least a portion of the mobile robot, or determining the one or more operating parameters further based, at least in part, on a distance between the mobile robot and a first region of the plurality of contiguous regions within the first unobserved portion of the safety field having an occupied state at the second time.

15. The method of claim 1, wherein assigning, to each region of a plurality of contiguous regions within the first unobserved portion of the safety field, an occupancy state comprises:

assigning an occupied state to at least one region of the plurality of contiguous regions at a boundary of the safety field within the first unobserved portion of the safety field.

16. The method of claim 1, wherein the one or more sensors include at least one first sensor coupled to the mobile robot and at least one second sensor not coupled to the mobile robot, and the first unobserved portion of the safety field includes a portion of the safety field not observable by the at least one first sensor or the at least one second sensor.

17. The method of claim 1, wherein the safety field includes a restricted zone around the mobile robot and a monitored zone located outside of the restricted zone, the method further comprising:

detecting an entity located in the monitored zone that has not yet entered the restricted zone;

determining whether the entity is an entity of concern; and determining the one or more operating parameters for the mobile robot based, at least in part, on whether the entity is an entity of concern.

18. The method of claim 17, further comprising:

determining whether the entity is moving toward the restricted zone, wherein determining the one or more operating parameters for the mobile robot is further based, at least in part, on whether the entity is moving toward the restricted zone.

19. A non-transitory computer-readable medium encoded with a plurality of instructions that, when executed, by at least one computer processor, perform a method of:

identifying, based on first sensor data received from one or more sensors, a first unobserved portion of a safety field in an environment of a mobile robot, the first sensor data being captured at a first time, wherein the first unobserved portion of the safety field corresponds to a portion of the safety field that the one or more sensors cannot observe at the first time due to a first occlusion;

assigning, to each region of a plurality of contiguous regions within the first unobserved portion of the safety field, an occupancy state;

updating, at a second time after the first time, the occupancy state of one or more regions of the plurality of contiguous regions within the first unobserved portion of the safety field;

determining one or more operating parameters for a mobile robot, the one or more operating parameters based, at least in part, on the occupancy state of at least some regions of the plurality of contiguous regions within the first unobserved portion of the safety field at the second time; and controlling the mobile robot to operate according to the one or more operating parameters.

20. A mobile robot, comprising:

one or more sensors configured to sense first sensor data at a first time; and at least one computer processor programmed to perform a method of:

identifying, based on the first sensor data, a first unobserved portion of a safety field in an environment of the mobile robot, wherein the first unobserved portion of the safety field corresponds to a portion of the safety field that the one or more sensors cannot observe at the first time due to a first occlusion;

assigning, to each region of a plurality of contiguous regions within the first unobserved portion of the safety field, an occupancy state;

updating, at a second time after the first time, the occupancy state of one or more regions of the plurality of contiguous regions within the first unobserved portion of the safety field;

determining one or more operating parameters for the mobile robot, the one or more operating parameters based, at least in part, on the occupancy state of at least some regions of the plurality of contiguous regions within the first unobserved portion of the safety field at the second time; and controlling the mobile robot to operate according to the one or more operating parameters.

* * * * *